(12) United States Patent
Zhao et al.

(10) Patent No.: US 12,117,365 B1
(45) Date of Patent: Oct. 15, 2024

(54) LUBRICATION ANALYSIS METHOD FOR STERN BEARING BASED ON MAGNETIC-HYDRAULIC COMPOSITE SUPPORT COUPLING

(71) Applicant: Harbin Engineering University, Heilongjiang (CN)

(72) Inventors: Bin Zhao, Heilongjiang (CN); Sheng Lv, Heilongjiang (CN); Wanyou Li, Heilongjiang (CN); Xiqun Lu, Heilongjiang (CN); Xuan Ma, Heilongjiang (CN); Xiujiang Shi, Heilongjiang (CN); Zhijun Shuai, Heilongjiang (CN); Yibin Guo, Heilongjiang (CN); Donghua Wang, Heilongjiang (CN); Hanzhang Xu, Heilongjiang (CN); Hongliang Li, Heilongjiang (CN); Lieyi Dong, Heilongjiang (CN)

(73) Assignee: Harbin Engineering University, Harbin (CN)

( * ) Notice: Subject to any disclaimer, the term of this patent is extended or adjusted under 35 U.S.C. 154(b) by 0 days.

(21) Appl. No.: 18/749,607

(22) Filed: Jun. 20, 2024

(30) Foreign Application Priority Data

Sep. 22, 2023 (CN) .......................... 202311238103.7

(51) Int. Cl.
*G01M 13/04* (2019.01)
*B63B 71/10* (2020.01)

(52) U.S. Cl.
CPC ............. *G01M 13/04* (2013.01); *B63B 71/10* (2020.01)

(58) Field of Classification Search
CPC ............................... G01M 13/04; B63B 71/10
See application file for complete search history.

(56) References Cited

U.S. PATENT DOCUMENTS 6,394,654 B1    5/2002  Khan et al.

FOREIGN PATENT DOCUMENTS

CN    113048150 A    6/2021
CN    115169016 A    10/2022

*Primary Examiner* — Kristina M Deherrera
*Assistant Examiner* — Jean F Morello

(57) ABSTRACT

The present disclosure provides a lubrication analysis method for a stern bearing based on magnetic-hydraulic composite support coupling, including: performing structural deformation analysis on a stern bearing on the basis of a magnetic support analysis result and a lubrication support analysis result to obtain a structural deformation amount, correcting a water film thickness, repeating lubrication and interface characteristics analysis to obtain water film pressures before and after correcting, comparing the water film pressures to determine whether convergence occurs, solving for a load carrying capacity of the stern bearing on the basis of the analysis result if the convergence occurs, determining whether the load carrying capacity is balanced with an input load, and calculating a bearing wear depth of the stern bearing on the basis of a contact force of a micro-convex body if the load carrying capacity is balanced with the input load.

13 Claims, 9 Drawing Sheets

LUBRICATION ANALYSIS METHOD FOR STERN BEARING BASED ON MAGNETIC-HYDRAULIC COMPOSITE SUPPORT COUPLING

CROSS-REFERENCE TO RELATED APPLICATIONS

This application claims priority of Chinese Patent Application No. 202311238103.7, filed on Sep. 22, 2023, the entire contents of which are incorporated herein by reference.

TECHNICAL FIELD

The present disclosure relates to the technical field of stern bearings, and in particular to a lubrication analysis method for a stern bearing based on magnetic-hydraulic composite support coupling.

BACKGROUND

A stern shaft in a ship is an important part of a propulsion shafting system. As a support part of the stern shaft, the lubricated load carrying property of a water lubricated stern bearing is critical to the continuously normal operation of stern shaft. The water lubricated stern bearing is usually operated under operating conditions of low speed and heavy load, and an interface of a friction pair is prone to serious frictional wear, which leads to an increase in a water film clearance, reducing the lubricated load carrying property of a stern bearing. The water lubricated stern bearing relies on outboard sea (river) water as a lubricating medium. There are more solid impurities such as sediment in the outboard water, so softer inner lining materials for stern shaft are commonly used to enhance sealing and adsorption of solid particles. However, the softer materials are subjected to greater deformation during operation, which is not conducive to the formation of a lubricating water film on the stern bearing. In addition, a tail end of the stern shaft of the ship is connected to a propeller, and the gravity of the propeller brings about flexural deformation of the stern shaft. The displacement of the flexural deformation leads to the deterioration of the lubrication state of the stern bearing, and the load carrying capacity is changed accordingly.

Currently, magnetic-hydraulic composite support is a feasible method to improve the lubrication and wear properties of the stern bearing, and can improve the common phenomenon of wear at the edge of the stern bearing to a certain extent.

However, there is no lubrication analysis method for magnetic-hydraulic composite support, making it difficult to effectively assess the lubrication degree of a stern bearing based on magnetic-hydraulic composite support.

SUMMARY

The present disclosure provides a lubrication analysis method for a stern bearing based on magnetic-hydraulic composite support coupling to solve the problem in the prior art that it is difficult to effectively assess the lubrication degree of a stern bearing based on magnetic-hydraulic composite support.

The present disclosure provides a lubrication analysis method for a stern bearing based on magnetic-hydraulic composite support coupling, including:

starting a timer, performing magnetic support characteristics analysis on a stern bearing to be analyzed to obtain a magnetic support analysis result, and performing lubrication and interface characteristics analysis on the stern bearing to obtain a lubrication support analysis result;

performing structural deformation analysis on the stern bearing on the basis of the magnetic support analysis result and the lubrication support analysis result, to obtain a structural deformation amount;

correcting a water film thickness in the lubrication support analysis result on the basis of the structural deformation amount, and returning to and performing the step of performing lubrication and interface characteristics analysis on the stern bearing on the basis of a corrected water film thickness, to obtain a corresponding first water film pressure and second water film pressure before and after correcting the water film thickness;

determining whether a water film pressure of the stern bearing is converged on the basis of the first water film pressure and the second water film pressure;

solving for a load carrying capacity of the stern bearing on the basis of the magnetic support analysis result and the lubrication support analysis result in a case that the water film pressure of the stern bearing is converged;

calculating a bearing wear depth of the stern bearing on the basis of a contact force of a micro-convex body in the lubrication support analysis result in a case of balance between the load carrying capacity and an input load preset;

returning to and performing at an interval of a second time preset, if the timer does not reach a first time preset, the step of performing magnetic support characteristics analysis on a stern bearing to be analyzed to obtain a magnetic support analysis result and performing lubrication and interface characteristics analysis on the stern bearing to obtain a lubrication support analysis result; and outputting a target result if the timer reaches the first time, the target result including: at least one of the magnetic support analysis result, the lubrication support analysis result, the structural deformation amount, the load carrying capacity of the stern bearing, and the bearing wear depth.

According to the lubrication analysis method for a stern bearing based on magnetic-hydraulic composite support coupling provided by the present disclosure, the performing lubrication and interface characteristics analysis on the stern bearing to be analyzed to obtain a lubrication support analysis result includes:

calculating a first water film thickness of the stern bearing on the basis of a geometric clearance of the stern bearing and an inclination amount of a stern shaft;

calculating the water film pressure of the stern bearing on the basis of the first water film thickness;

calculating a contact force of a micro-convex body in the stern bearing on the basis of the first water film thickness and the water film pressure; and taking at least one of the first water film thickness, the water film pressure and the contact force of the micro-convex body as the lubrication support analysis result.

According to the lubrication analysis method for a stern bearing based on magnetic-hydraulic composite support coupling provided by the present disclosure, the magnetic support analysis result includes a magnetic attraction force of the stern bearing; and the performing structural deformation analysis on the stern bearing on the basis of the magnetic support analysis result and the lubrication support analysis result, to obtain a structural deformation amount includes:

calculating a flexural deformation amount of the stern bearing on the basis of the water film pressure, the contact force of the micro-convex body and the magnetic attraction force;

calculating an elastic deformation amount of a bearing shell of the stern bearing on the basis of the water film pressure and the contact force of the micro-convex body; and taking at least one of the flexural deformation amount and the elastic deformation amount of the bearing shell as the structural deformation amount.

According to the lubrication analysis method for a stern bearing based on magnetic-hydraulic composite support coupling provided by the present disclosure, the method further includes:

calculating, in a case that the water film pressure of the stern bearing is not converged, an updated water film thickness on the basis of the geometric clearance, the inclination amount of the stern shaft and the structural deformation amount, taking the updated water film thickness as the first water film thickness, and returning to and performing the step of calculating the water film pressure of the stern bearing on the basis of the first water film thickness.

According to the lubrication analysis method for a stern bearing based on magnetic-hydraulic composite support coupling provided by the present disclosure, the method further includes:

adjusting the inclination amount of the stern shaft by adjusting a first parameter in a case of imbalance between the load carrying capacity and the input load, and returning to and performing the step of calculating a first water film thickness of the stern bearing on the basis of a geometric clearance of the stern bearing and an inclination amount of a stern shaft.

According to the lubrication analysis method for a stern bearing based on magnetic-hydraulic composite support coupling provided by the present disclosure, the method further includes:

updating, in a case that the timer does not reach the first time, the first water film thickness on the basis of the geometric clearance, the inclination amount of the stern shaft, the structural deformation amount, and the bearing wear depth.

According to the lubrication analysis method for a stern bearing based on magnetic-hydraulic composite support coupling provided by the present disclosure, the structural deformation amount includes a flexural deformation amount and an elastic deformation amount of the bearing shell, and the updating the first water film thickness on the basis of the geometric clearance, the inclination amount of the stern shaft, the structural deformation amount, and the bearing wear depth includes:

calculating, using Formula (1), a first film thickness $h_1$ of the stern bearing taking an inclination of a shaft journal into account on the basis of the geometric clearance and the inclination amount of the stern shaft:

$$h_1 = c + (e_x^0 + z \cdot \tan \alpha_x) \sin \theta - (e_y^0 + z \cdot \tan \alpha_y) \cos \theta \qquad (1)$$

where c characterizes a radius of a clearance, c=R−r, R characterizing a radius of a bearing, and r characterizing a radius of the shaft journal, $e_x^0$ characterizes an eccentric distance of a middle cross-section of the shaft journal in an x-direction, $e_y^0$ characterizes an eccentric distance of the middle cross-section of the shaft journal in a y-direction, z characterizes axial coordinates, $\alpha_x$ characterizes an inclination angle of the shaft journal in the x-direction, $\alpha_y$ characterizes an inclination angle of the shaft journal in the y-direction, and θ characterizes circumferential angle coordinates;

calculating, on the basis of the flexural deformation amount, a water film thickness change amount $h_{i\theta}$ corresponding to each cross-section of the stern bearing when deformed under load; and calculating an updated first water film thickness on the basis of the first film thickness $h_1$, the water film thickness change amount $h_{i\theta}$, an elastic deformation amount $\delta_E$ of the bearing shell, and a bearing wear depth $h_w$.

According to the lubrication analysis method for a stern bearing based on magnetic-hydraulic composite support coupling provided by the present disclosure, the calculating an updated first water film thickness on the basis of the first film thickness $h_1$, the water film thickness change amount $h_{i\theta}$, an elastic deformation amount $\delta_E$ of the bearing shell, and a bearing wear depth $h_w$ includes:

calculating, using Formula (2), an updated first water film thickness h on the basis of the first film thickness $h_1$, the water film thickness change amount $h_{i\theta}$, the elastic deformation amount $\delta_E$ of the bearing shell, and the bearing wear depth $h_w$;

$$h = h_1 + h_{i\theta} + h_w + \delta_E \qquad (2).$$

The present disclosure further provides a lubrication analysis device for a stern bearing based on magnetic-hydraulic composite support coupling, including:

a magnetic-hydraulic analysis module, configured to start a timer, perform magnetic support characteristics analysis on a stern bearing to be analyzed to obtain a magnetic support analysis result, and perform lubrication and interface characteristics analysis on the stern bearing to obtain a lubrication support analysis result;

a structural deformation analysis module, configured to perform structural deformation analysis on the stern bearing on the basis of the magnetic support analysis result and the lubrication support analysis result, to obtain a structural deformation amount;

an acquisition module, configured to correct a water film thickness in the lubrication support analysis result on the basis of the structural deformation amount, and return to and perform the step of performing lubrication and interface characteristics analysis on the stern bearing on the basis of a corrected water film thickness, to obtain a corresponding first water film pressure and second water film pressure before and after correcting the water film thickness;

a first determination module, configured to determine whether a water film pressure of the stern bearing is converged on the basis of the first water film pressure and the second water film pressure;

a second determination module, configured to solve for a load carrying capacity of the stern bearing on the basis of the magnetic support analysis result and the lubrication support analysis result in a case that the water film pressure of the stern bearing is converged;

a calculation module, configured to calculate a bearing wear depth of the stern bearing on the basis of a contact force of a micro-convex body in the lubrication support analysis result in a case of balance between the load carrying capacity and an input load preset; and a processing module, configured to return to and perform at an interval of a second time preset, if the timer does not reach a first time preset, the step of performing magnetic support characteristics analysis on a stern bearing to be analyzed to obtain a magnetic support analysis result and performing lubrication and interface characteristics analysis on the stern bearing to obtain a lubrication support analysis result; and output a target result if the timer reaches the first time, the target result including: at least one of the magnetic support analysis result, the lubrication support analysis result, the structural deformation amount, the load carrying capacity of the stern bearing, and the bearing wear depth.

The present disclosure further provides an electronic apparatus, including a memory, a processor, and a computer program stored in the memory and runnable in the processor. A lubrication analysis method for a stern bearing based on magnetic-hydraulic composite support coupling described above is implemented when the processor executes the program.

The present disclosure further provides a non-transitory computer-readable storage medium, having a computer program stored thereon. A lubrication analysis method for a stern bearing based on magnetic-hydraulic composite support coupling described above is implemented when the computer program is executed by a processor.

The present disclosure further provides a computer program product, including a computer program. A lubrication analysis method for a stern bearing based on magnetic-hydraulic composite support coupling described above is implemented when the computer program is executed by a processor.

According to the lubrication analysis method for a stern bearing based on magnetic-hydraulic composite support coupling provided by the present disclosure, the timer can be started and lubrication analysis on lubrication of the stern bearing is performed within the first time preset; and wear-related parameters are updated in a case that the calculation of a current time step (the first time) is completed. In the specific process of the lubrication analysis, magnetic support characteristics analysis and lubrication and interface characteristics analysis are separately performed on the stern bearing to be analyzed to obtain the magnetic support analysis result and the lubrication support analysis result; structural deformation analysis is performed on the stern bearing on the basis of the magnetic support analysis result and the lubrication support analysis result to obtain the structural deformation amount; the water film thickness in the lubrication support analysis result is corrected on the basis of the structural deformation amount; the lubrication and interface characteristics analysis is repeated on the basis of the corrected water film thickness to obtain the corresponding first water film pressure and second water film pressure before and after the water film thickness is corrected, so that it can be determined whether the water film pressure of the stern bearing is converged by comparing the first water film pressure and the second water film pressure; in a case that the convergence occurs, the load carrying capacity of the stern bearing can be solved for on the basis of the magnetic support analysis result and the lubrication support analysis result, and it can be determined whether the load carrying capacity is balanced with the input load, and if so, the bearing wear depth of the stern bearing is calculated on the basis of the contact force (interface characteristic) of the micro-convex body in the lubrication support analysis result; and at this point, if the timer has not reached the first time, the step that magnetic support characteristics analysis and lubrication and interface characteristics analysis are performed on the stern bearing to be analyzed is returned to and performed until the timer reaches the first time, and the target result is outputted. The target result can be intermediate quantities and resulting quantities in the lubrication analysis process described above, and in the embodiments of the present disclosure, the target result can be utilized to effectively assess the lubrication degree of the stern bearing based on the magnetic-hydraulic composite support.

BRIEF DESCRIPTION OF THE DRAWINGS

To state the technical solutions in the present disclosure or the prior art clearer, the attached drawings needed in the embodiments or prior art are introduced briefly below. Obviously, the drawings described below are some embodiments of the present disclosure, and for those skilled in the art, other drawings can be obtained according to these drawings without creative efforts.

DETAILED DESCRIPTION

For clearer objective, technical solutions and advantages of the present disclosure, the technical solutions of the present disclosure will be described clearly and completely with reference to the attached drawings in the present disclosure below. Obviously, the embodiments described are only some, rather than all embodiments of the present disclosure. On the basis of the embodiments of the present disclosure, all other embodiments obtained by those ordinary skilled in the art without creative efforts fall within the scope of protection of the present disclosure.

A lubrication analysis method for a stern bearing based on magnetic-hydraulic composite support coupling of the present disclosure is described by reference to the attached drawings.

Figure 1:
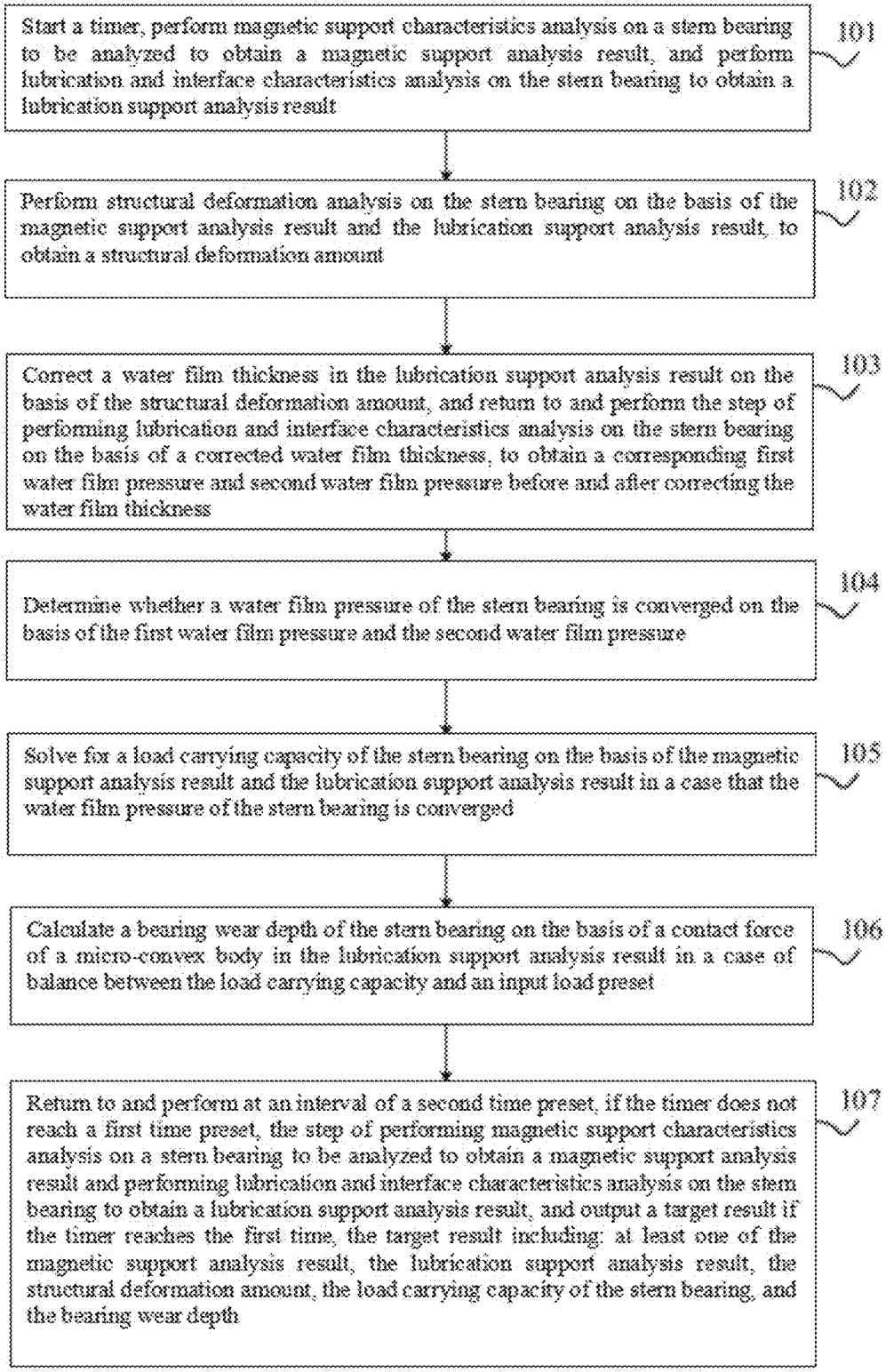
FIG. 1 is a flow chart of a lubrication analysis method for a stern bearing based on magnetic-hydraulic composite support coupling according to the present disclosure.

FIG. 1 is a flow chart of a lubrication analysis method for a stern bearing based on magnetic-hydraulic composite support coupling according to the present disclosure. As shown in FIG. 1, the method includes steps 101 to 107.

In step 101, a timer is started, magnetic support characteristics analysis is performed on a stern bearing to be analyzed to obtain a magnetic support analysis result, and lubrication and interface characteristics analysis is performed on the stern bearing to obtain a lubrication support analysis result.

In step 102, structural deformation analysis is performed on the stern bearing on the basis of the magnetic support analysis result and the lubrication support analysis result to obtain a structural deformation amount.

In step 103, a water film thickness in the lubrication support analysis result is corrected on the basis of the structural deformation amount, and the step of performing lubrication and interface characteristics analysis on the stern bearing is returned to and performed on the basis of a corrected water film thickness, to obtain a corresponding first water film pressure and second water film pressure before and after the water film thickness is corrected.

In step 104, it is determined whether a water film pressure of the stern bearing is converged on the basis of the first water film pressure and the second water film pressure.

In step 105, a load carrying capacity of the stern bearing is solved for on the basis of the magnetic support analysis result and the lubrication support analysis result in a case that the water film pressure of the stern bearing is converged.

In step 106, a bearing wear depth of the stern bearing is calculated on the basis of a contact force of a micro-convex body in the lubrication support analysis result in a case of balance between the load carrying capacity and an input load preset.

In step 107, if the timer does not reach a first time preset, the step of performing magnetic support characteristics analysis on a stern bearing to be analyzed to obtain a magnetic support analysis result and performing lubrication and interface characteristics analysis on the stern bearing to obtain a lubrication support analysis result is returned to and performed at an interval of a second time preset; and a target result is outputted if the timer reaches the first time, the target result including: at least one of the magnetic support analysis result, the lubrication support analysis result, the structural deformation amount, the load carrying capacity of the stern bearing, and the bearing wear depth.

In related art, there is no lubrication analysis method for magnetic-hydraulic composite support, making it difficult to effectively assess the lubrication degree of the stern bearing based on magnetic-hydraulic composite support.

The method provided in the embodiments of the present disclosure is a lubrication analysis method for a water lubricated stern bearing taking into account the coupling effect of a magnetic support and a hydraulic support. Both the magnetic support and the hydraulic support affect the interaction between a shaft journal and a bearing through their support characteristics (changes in load carrying capacity), resulting in different lubrication properties. Therefore, in the embodiments of the present disclosure, on the basis of a structure of a certain type of a stern bearing with magnetic-hydraulic composite support, the lubrication state and the surface wear characteristics of the stern bearing under magnetic-hydraulic coupling effect after the introduction of the magnetic support can be analyzed in a more detailed way.

Specifically, the timer can be started and lubrication analysis of lubrication of the stern bearing is performed within the first time preset, and wear-related parameters are updated in a case that the calculation of a current time step (the first time) is completed.

In the specific process of the lubrication analysis, magnetic support characteristics analysis and lubrication and interface characteristics analysis are separately performed on the stern bearing to be analyzed to obtain the magnetic support analysis result and the lubrication support analysis result; structural deformation analysis is performed on the stern bearing on the basis of the magnetic support analysis result and the lubrication support analysis result to obtain the structural deformation amount; the water film thickness in the lubrication support analysis result is corrected on the basis of the structural deformation amount; the lubrication and interface characteristics analysis is repeated on the basis of the corrected water film thickness to obtain the corresponding first water film pressure and second water film pressure before and after the water film thickness is corrected, so that it can be determined whether the water film pressure of the stern bearing is converged by comparing the first water film pressure and the second water film pressure; in a case that the water film pressure is converged, the load carrying capacity of the stern bearing can be solved for on the basis of the magnetic support analysis result and the lubrication support analysis result, and it can be determined whether the load carrying capacity is balanced with the input load, and if so, the bearing wear depth of the stern bearing is calculated on the basis of the contact force (interface characteristic) of the micro-convex body in the lubrication support analysis result; and at this point, if the timer has not reached the first time, the step that magnetic support characteristics analysis and lubrication and interface characteristics analysis are performed on the stern bearing to be analyzed is returned to and performed until the timer reaches the first time, and the target result is outputted. The target result can be intermediate quantities and resulting quantities in the lubrication analysis process described above.

It is to be noted that if the timer has not reached the first time, intermediate quantities or resulting quantities obtained in the previous round may affect the new round of magnetic support characteristics analysis or lubrication and interface characteristics analysis if the step that the magnetic support characteristics analysis and lubrication and interface characteristics analysis are performed on the stern bearing to be analyzed is returned to and performed.

For example, a bearing wear depth calculated in the previous round of calculations will affect the lubrication support analysis result obtained from the lubrication and interface characteristics analysis in a case that the next round of analysis is performed. This is because the bearing wear depth can be taken into account in terms of the determination of the water film thickness in the lubrication and interface characteristics analysis, thus affecting the entire process of the lubrication and interface characteristics analysis, and ultimately affecting the lubrication support analysis result.

For the target result, resulting quantities of the last round before the output, or intermediate quantities corresponding to the previous round or rounds can be taken as the target result to reflect the process variation of the lubrication analysis.

In the lubrication analysis method for a stern bearing based on magnetic-hydraulic composite support coupling provided in the embodiments of the present disclosure, the timer can be started and lubrication analysis of lubrication of the stern bearing is performed within the first time preset, and wear-related parameters are updated in a case that the calculation of a current time step (the first time) is completed. In the specific process of the lubrication analysis, magnetic support characteristics analysis and lubrication and interface characteristics analysis are separately performed on the stern bearing to be analyzed to obtain the magnetic support analysis result and the lubrication support analysis result; structural deformation analysis is performed on the stern bearing on the basis of the magnetic support analysis result and the lubrication support analysis result to obtain the structural deformation amount; the water film thickness in the lubrication support analysis result is corrected on the basis of the structural deformation amount; the lubrication and interface characteristics analysis is repeated on the basis of the corrected water film thickness to obtain the corresponding first water film pressure and second water film pressure before and after the water film thickness is corrected, so that it can be determined whether the water film pressure of the stern bearing is converged by comparing the first water film pressure and the second water film pressure; in a case that the convergence occurs, the load carrying capacity of the stern bearing can be solved for on the basis of the magnetic support analysis result and the lubrication support analysis result, and it can be determined whether the load carrying capacity is balanced with the input load, and if so, the bearing wear depth of the stern bearing is calculated on the basis of the contact force (interface characteristic) of the micro-convex body in the lubrication support analysis result; and at this point, if the timer has not reached the first time, the step that magnetic support characteristics analysis and lubrication and interface characteristics analysis are performed on the stern bearing to be analyzed is returned to and performed until the timer reaches the first time, and the target result is outputted. The target result can be intermediate quantities and resulting quantities in the lubrication analysis process described above, and in the embodiments of the present disclosure, the target result can be utilized to effectively assess the lubrication degree of the stern bearing based on the magnetic-hydraulic composite support.

Alternatively, an implementation manner of performing lubrication and interface characteristics analysis on the stern bearing to obtain a lubrication support analysis result may include the following.

A first water film thickness of the stern bearing is calculated on the basis of a geometric clearance of the stern bearing and an inclination amount of a stern shaft.

The water film pressure of the stern bearing is calculated on the basis of the first water film thickness.

A contact force of a micro-convex body in the stern bearing is calculated on the basis of the first water film thickness and the water film pressure.

At least one of the first water film thickness, the water film pressure and the contact force of the micro-convex body is taken as the lubrication support analysis result.

Specifically, the calculating a first water film thickness of the stern bearing on the basis of a geometric clearance of the stern bearing and an inclination amount of a stern shaft may be derived as follows.

Figure 2:
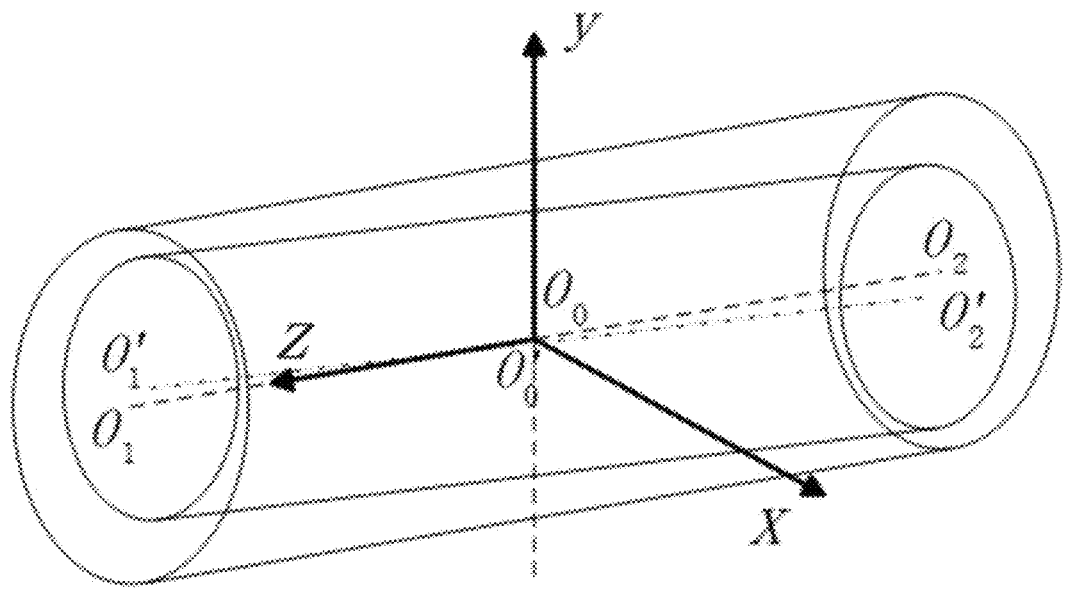
FIG. 2 is a schematic diagram of a stern bearing in a certain operating state in the lubrication analysis method for a stern bearing based on magnetic-hydraulic composite support coupling according to the present disclosure.
Figure 3:
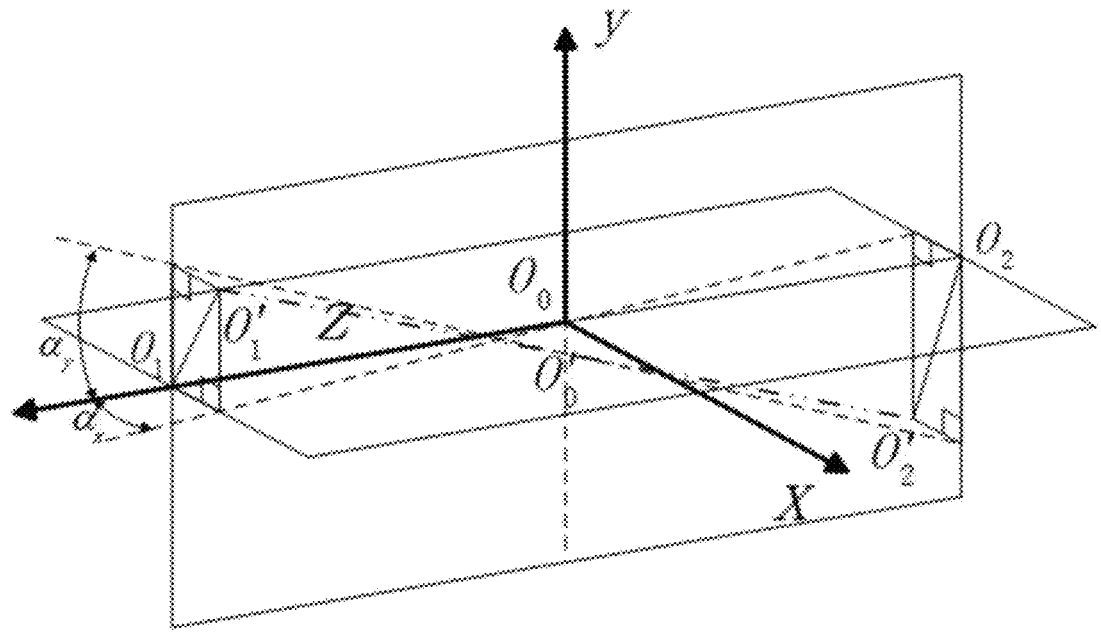
FIG. 3 is another schematic diagram of the stern bearing in a certain operating state in the lubrication analysis method for a stern bearing based on magnetic-hydraulic composite support coupling according to the present disclosure.
Figure 4:
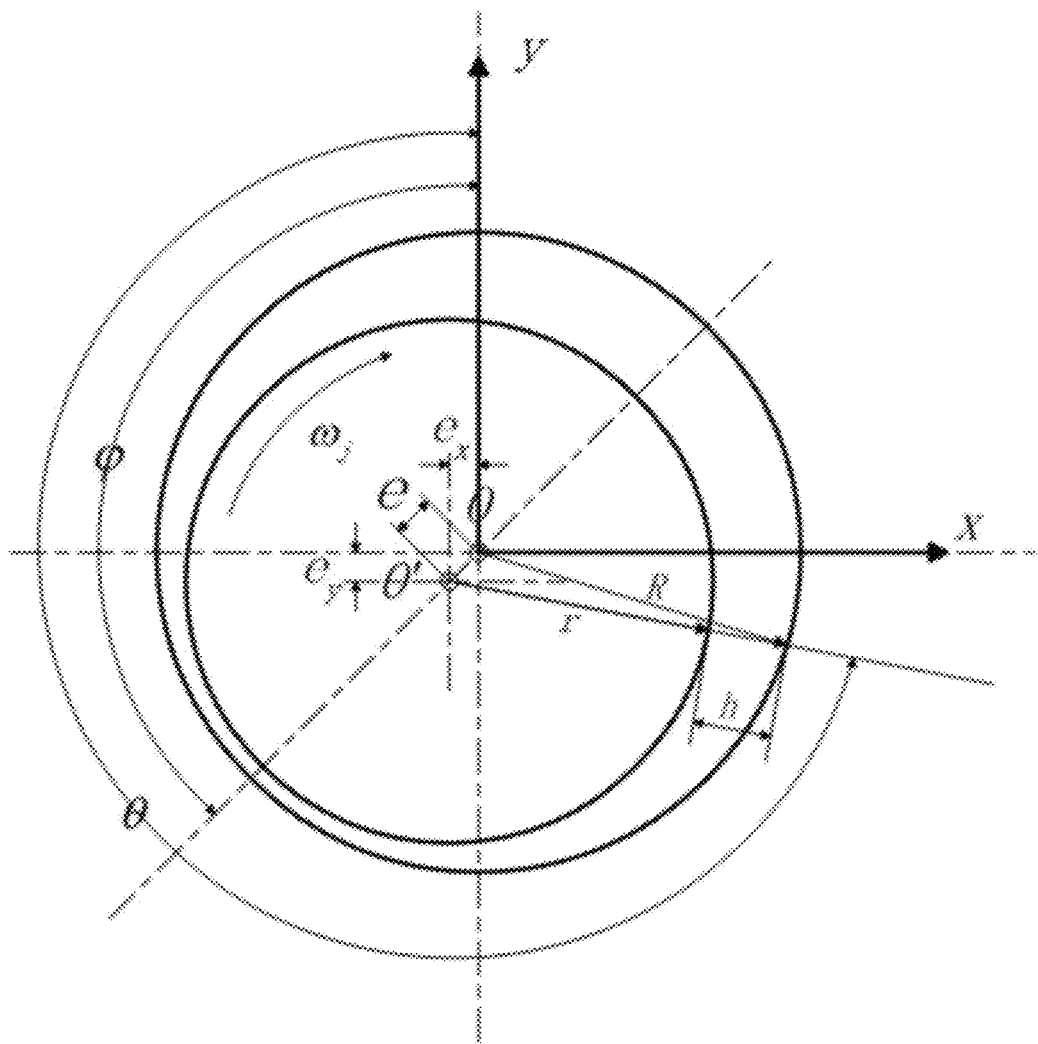
FIG. 4 is a schematic diagram of a cross-section of the stern bearing in a certain operating state in the lubrication analysis method for a stern bearing based on magnetic-hydraulic composite support coupling according to the present disclosure.

FIG. 2 is a schematic diagram of a stern bearing in a certain operating state in the lubrication analysis method for a stern bearing based on magnetic-hydraulic composite support coupling according to the present disclosure. FIG. 3 is another schematic diagram of the stern bearing in a certain operating state in the lubrication analysis method for a stern bearing based on magnetic-hydraulic composite support coupling according to the present disclosure. FIG. 4 is a schematic diagram of a cross-section of the stern bearing in a certain operating state in the lubrication analysis method for a stern bearing based on magnetic-hydraulic composite support coupling according to the present disclosure.

As shown in FIGS. 2 to 4, FIGS. 2 and 3 show a sliding bearing in a certain operating state, and spatial inclination angles are denoted by $\alpha_x$ and $\alpha_y$, which are inclination angles in an x-direction and y-direction, respectively. FIG. 4 shows a cross-section of the sliding bearing, R and r represent a radius of a bearing and a radius of a shaft journal, respectively, and accordingly, a radius clearance is defined as c=R−r; e and φ represent an eccentric distance and an eccentric angle of the shaft journal, respectively; by decomposing the eccentric distance in x-direction and y-direction, $e_x$ and $e_y$ can be obtained to represent horizontal and vertical components of the eccentric distance, satisfying e=$(e_x^2+e_y^2)^{1/2}$; h' represents a water film thickness at a circumferential coordinate θ; and $\omega_j$ represents a rotating speed of the stern bearing at normal operation, which is usually considered to be unchanged.

An expression for a film thickness without considering an inclination of the shaft journal can be derived from the geometric relationship:

$$h'=c-e\cos(\theta-\varphi)=c(1-\varepsilon\cos(\theta-\varphi))=c+e_x\sin\theta-e_y\cos\theta$$

where ε represents an eccentricity ratio, which is defined as ε=e/c.

Considering the inclination of the shaft journal, the eccentric distances of each cross-section in x and y directions can be calculated using the following formula:

$$\begin{cases} e_x(z) = e_x^0 + z \cdot \tan\alpha_x \\ e_y(z) = e_y^0 + z \cdot \tan\alpha_y \end{cases}$$

where $e_x^0$ and $e_y^0$ represent eccentric distances of a middle cross-section of the shaft journal in the x and y directions, respectively, and $\alpha_x$ and $\alpha_y$ represent x- and y-directional inclination angles of the shaft journal that increase $e_x$ and $e_y$ in a cross-section of z>0.

It can be found that without considering the inclination of the shaft journal, the water film thickness h' is only related to the eccentric distances $e_x$ and $e_y$ in two directions; and with considering the inclination of the shaft journal, it is necessary to introduce x- and y-directional inclination angles of the shaft journal, so that the water film thickness h' is a function of the eccentric distances $e_x^0$ and $e_y^0$ in the middle cross-section and inclination angles $\alpha_x$ and $\alpha_y$ of the shaft journal, that is:

$$h' = c + (e_x^0 + z \cdot \tan \alpha_x) \sin \theta - (e_y^0 + z \cdot \tan \alpha_y) \cos \theta.$$

Alternatively, the magnetic support analysis result includes a magnetic attraction force of the stern bearing; and an implementation manner of performing structural deformation analysis on the stern bearing on the basis of the magnetic support analysis result and the lubrication support analysis result, to obtain a structural deformation amount may include the following.

A flexural deformation amount of the stern bearing is calculated on the basis of the water film pressure, the contact force of the micro-convex body and the magnetic attraction force.

An elastic deformation amount of a bearing shell of the stern bearing is calculated on the basis of the water film pressure and the contact force of the micro-convex body.

At least one of the flexural deformation amount and the elastic deformation amount of the bearing shell is taken as the structural deformation amount.

Specifically, (I) magnetic support characteristics analysis is illustrated as follows.

1) Structural Model and Magnetic Field Analysis

Figure 5:
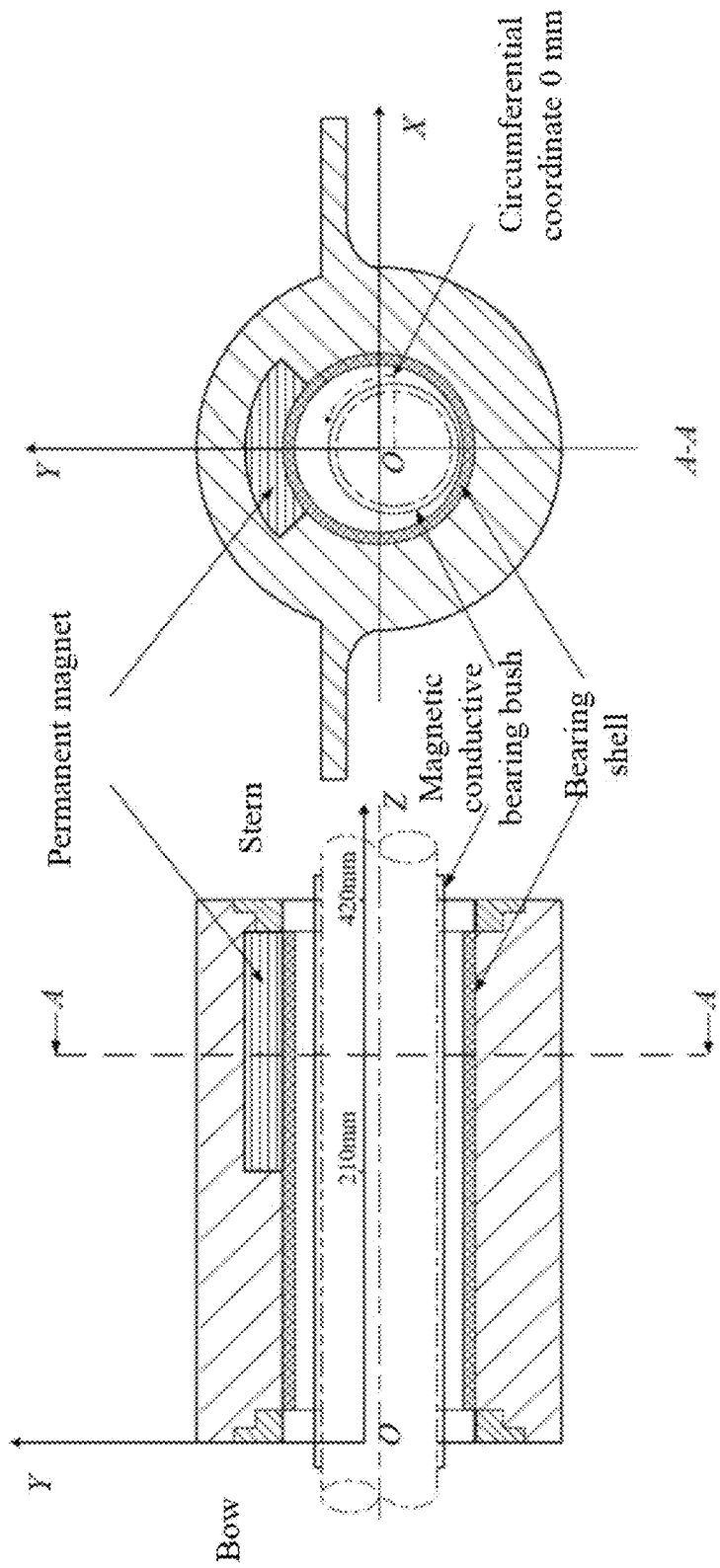
FIG. 5 is a schematic diagram of a structure between a permanent magnet and the stern bearing in the lubrication analysis method for a stern bearing based on magnetic-hydraulic composite support coupling according to the present disclosure.
Figure 6:
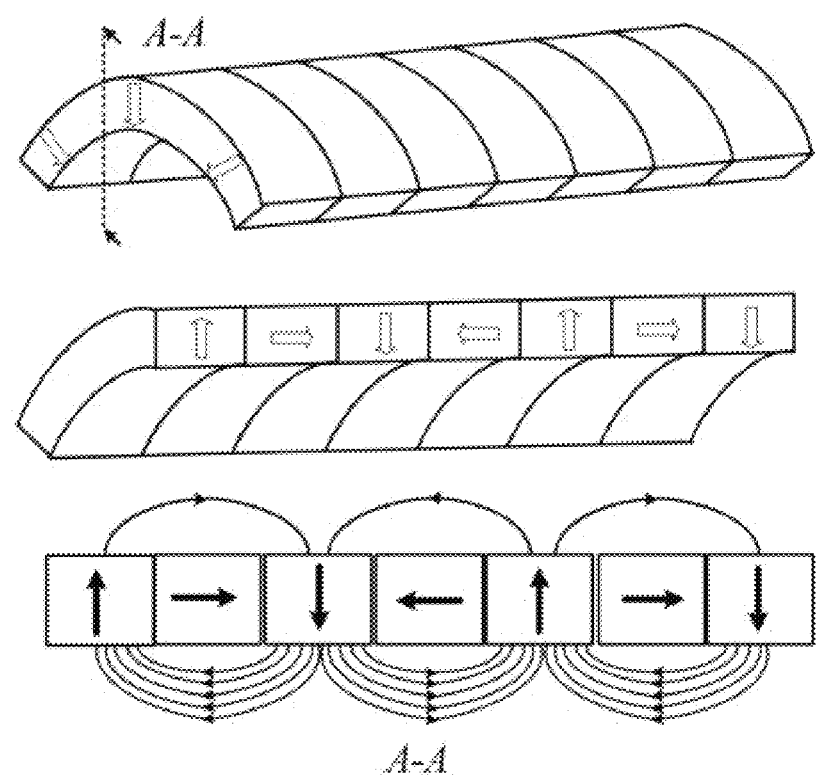
FIG. 6 is a schematic diagram of a region of the permanent magnet and magnetic pole arrangement thereof in the lubrication analysis method for a stern bearing based on magnetic-hydraulic composite support coupling according to the present disclosure.

FIG. 5 is a schematic diagram of a structure between a permanent magnet and the stern bearing in the lubrication analysis method for a stern bearing based on magnetic-hydraulic composite support coupling according to the present disclosure. As shown in FIG. 5, the region of permanent magnet is a Halbach permanent magnet array, which serves to strengthen a magnetic field on one side of the magnet (a negative side near Y in the figure) and weaken a magnetic field on the other side (a positive side near Y in the figure) to near zero, and permanent magnet blocks are arranged in the form of alternating radial and axial magnetization. FIG. 6 is a schematic diagram of the region of the permanent magnet and magnetic pole arrangement thereof in the lubrication analysis method for a stern bearing based on magnetic-hydraulic composite support coupling according to the present disclosure.

Figure 7:
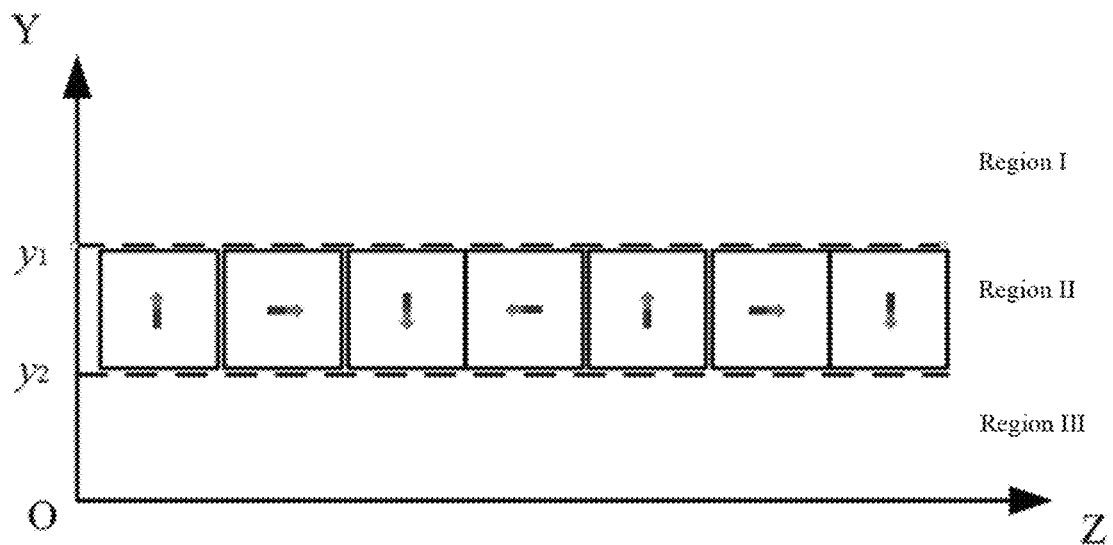
FIG. 7 is a schematic diagram of the division of the region of the permanent magnet into three regions in the lubrication analysis method for a stern bearing based on magnetic-hydraulic composite support coupling according to the present disclosure.

To solve for a magnetic attraction force of the permanent magnet array to a shaft, it is necessary to obtain the magnetic flux density distribution in a clearance region between the permanent magnet array and a shaft journal in the magnetic field analysis. According to the characteristics of the Halbach permanent magnet array, and ignoring the end effect and the influence of other structures such as copper bush and yoke iron on the magnetic field, an analysis region can be divided into three parts. FIG. 7 is a schematic diagram of the division of the region of the permanent magnet into three regions in the lubrication analysis method for a stern bearing based on magnetic-hydraulic complex support coupling provided by the present disclosure. As shown in FIG. 7, it is approximately considered that a relative magnetic conductivity $\mu_r$ of regions I and III is equal to 1, and a region II is a Halbach permanent magnet array. The magnetic flux density distribution in the region III can be obtained by the following formula:

$$\vec{B}_{III} = -\mu_0 \sum_{k=1}^{\infty} \lambda K_{III} e^{\lambda r} \begin{bmatrix} \cos \lambda z \\ \sin \lambda z \end{bmatrix}$$

where $\mu_0$ represents a vacuum magnetic conductivity, $\lambda = k\omega$, k representing the number of harmonic waves, w representing a coefficient related to an array structure, $\omega = 2\pi/l$, and l representing an axial length of a Halbach array module; and $K_{III}$ is calculated by the following formula:

$$K_{III} = -\frac{B_r}{2\mu_0 \lambda} \left( e^{-\lambda y_2} - e^{-\lambda y_1} \right)(m_k + n_k)$$

where $$\begin{cases} m_k = \dfrac{4}{k\pi} \sin \dfrac{k\pi}{2} \cos \dfrac{k\omega\tau}{2} \\ n_k = \dfrac{4}{k\pi} \sin \dfrac{k\pi}{2} \sin \dfrac{k\pi\tau}{2}, \end{cases}$$

and $y_1$ and $y_2$ are y-directional coordinates at a boundary of a medium.

It is to be noted that in a case of solving for the magnetic flux density in the region III, the number of harmonic waves that can be summed to meet the accuracy requirements can be set to meet the engineering needs.

2) Magnetic Attraction Force Calculation Model

A force on a ferromagnetic material in a magnetic field is usually calculated using a Maxwell stress tensor method or a principle of virtual work method. The Maxwell stress tensor method is used to solve for a magnetic attraction force of the Halbach array to a rotating shaft.

Assuming there are no end effect and magnetic leakage, the magnetic induction strength of a region, not covered by the permanent magnet array, on a surface of the rotating shaft is 0 (the covered region is schematically shown below).

Figure 8:
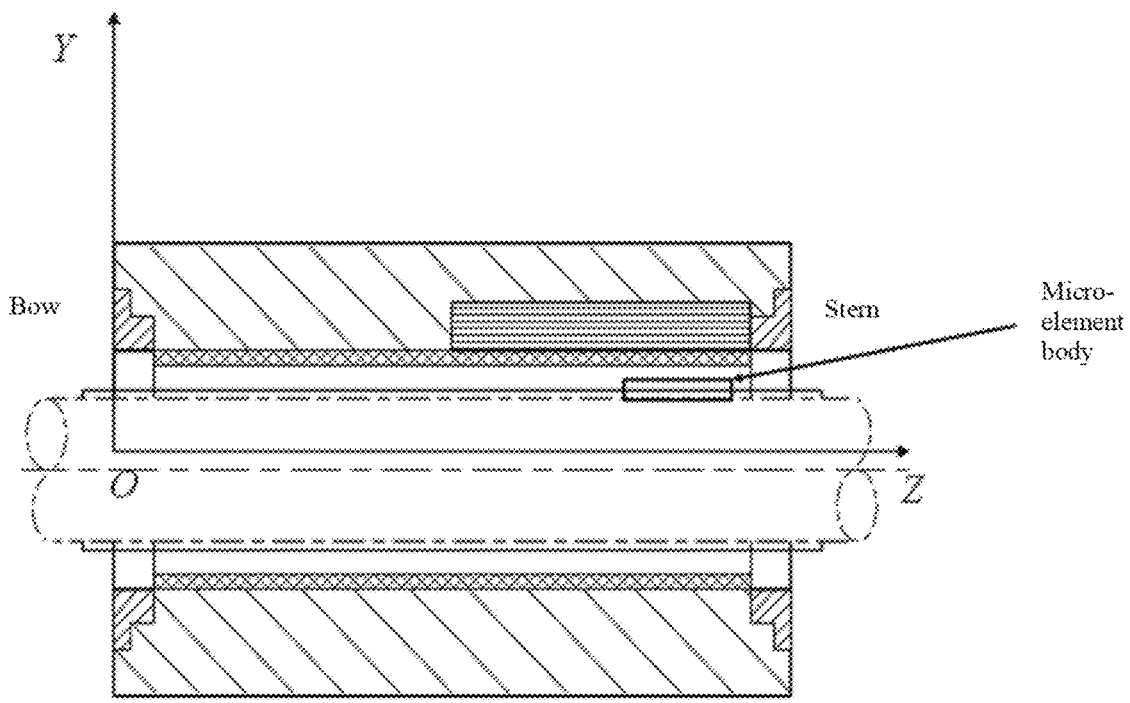
FIG. 8 is a schematic diagram of the relationship between a micro-element body and the stern bearing in the lubrication analysis method for a stern bearing based on magnetic-hydraulic composite support coupling according to the present disclosure.

Firstly, a magnetic attraction force on a micro-element volume of a surface of a shaft journal is calculated. FIG. 8 is a schematic diagram of the relationship between a micro-element body and the stern bearing in the lubrication analysis method for a stern bearing based on magnetic-hydraulic composite support coupling according to the present disclosure. As shown in FIG. 8, a micro-element with length, width, and height is considered at a clearance between the Halbach array and the rotating shaft, with a width direction not shown. An upper surface of the micro-element is adjacent to an outer side of an outer surface of the rotating shaft, and a lower surface of the micro-element is adjacent to an outer side of an inner surface of the rotating shaft. According to the stress tensor method, a volume integral is converted to an area integral by a divergence theorem, and a force of the magnetic field acting on the micro-element body can be expressed as:

$$F_{mce} = \frac{1}{2\mu_0} \int_S B_n^2 \hat{n} dS$$

where $B_n$ represents a component perpendicular to a surface S of the magnetic flux density in the region III, and the above formula can be further written as:

$$F_{mce} = \frac{r}{2\mu_0} B_n^2 d\varphi dz.$$

In summary, the magnetic attraction force of the Halbach permanent magnet array to the shaft journal (y-direction) can be obtained:

$$F_{MG} = \iint_{\Phi, Z} F_{mce} \cos \varphi d\varphi dz$$

where $\Phi'$ and Z represent coordinate ranges of a region of the shaft journal covered by the permanent magnet.

(II) The contact force of the micro-convex body is analyzed as follows.

In the embodiments of the present disclosure, a G-T contact model is employed with the following expression:

$$p_c(h) = K \cdot E \cdot F(H)$$

where E represents an integrated elasticity modulus, which can be obtained from elasticity moduli of two contact surfaces $E_1$ and $E_2$, and Poisson's ratios $v_1$ and $v_2$, and specifically obtained by the following formula:

$$E = \left[\frac{1-v_1^2}{E_1} + \frac{1-v_2^2}{E_2}\right]^{-1};$$

F(H) is a distribution function, which can be obtained by the following formula:

$$F(H) = \begin{cases} 4.4086 \times 10^{-5}(4-H)^{6.804}, & H \le 4 \\ 0, & H > 4 \end{cases};$$

and

K represents an elasticity coefficient, which can be obtained by the following formula:

$$K = \left(\frac{16\sqrt{2}}{15}\right)\pi(\Phi\beta\sigma)^2 \cdot E \cdot \sqrt{\frac{\sigma}{\beta}}$$

where $\Phi$ represents a density of the micro-convex body, and $\beta$ represents a radius of curvature of a rough peak of the micro-convex body.

(III) The flexure of stern shaft is analyzed as follows.

Under the combined effect of gravity of a propeller, a fluid pressure and a contact pressure, flexure is generated in a stern bearing, and an approximate differential equation for a flexure curve of a stern shaft is:

$$\frac{d^2v}{dx^2} = \frac{M(x)}{EI}$$

where E represents an elasticity modulus of the shaft; and I represents an inertia moment of a centroidal axis, and for a circular cross-section, $I = D^4\pi/64$, D representing a diameter of the shaft. The following flexure curve equation can be obtained by integration:

$$v = \iint\left[\int\frac{M(x)}{EI}dx\right]dx + Cx + D$$

where C and D are constants, determined by boundary conditions.

According to a loaded condition and the boundary conditions, flexure curve equations for the shaft subjected to a concentrated force can be obtained as:

$$v_x = \begin{cases} -\dfrac{F_x z^2}{6EI}(3a-z), & 0 \le z \le a \\ -\dfrac{F_x a^2}{6EI}(3z-a), & 0 \le z \le l \end{cases}$$

$$v_y = \begin{cases} -\dfrac{F_y z^2}{6EI}(3a-z), & 0 \le z \le a \\ -\dfrac{F_y a^2}{6EI}(3z-a), & 0 \le z \le l \end{cases}$$

where a represents an axial position of a point acted by the concentrated force, and the loaded condition can be characterized by $F_x$, $F_y$ and a.

In a case that the shaft is deformed under load in the bearing, a water film thickness corresponding to each cross-section changes, at which point the following formula is obtained:

$$h_{i\theta} = e_i \cos(\theta - \varphi)$$

where i represents an axial discrete degree (number of nodes) of the stern bearing, and $e_i$ represents an eccentric distance of an $i_{th}$ axial segment after taking into account flexural deformation, specifically: $e_i = (v_{ix}^2 + v_{iy}^2)^{1/2}$.

The gravity of the propeller is a concentrated force acting on a tail end of the stern shaft. In addition, in a case that an axial discrete degree of a stern shaft calculation region is large enough, the combined force resulting from the integration of a fluid pressure (p) and a contact pressure ($p_c$) along the surface of action of each axial segment can be regarded as a concentrated force, and this concentrated force is vectorially summed up with a magnetic support force ($F_m$) on the axial segment to obtain $F_x$ and $F_y$ required for the calculation of the flexural displacement in this module. The final flexural displacement of a certain axial segment is obtained by linearly superimposing x- and y-directional components of the flexural displacement of this axial segment under various factors.

(IV) Elastic deformation of a bearing inner bore surface is analyzed as follows.

Since an elasticity modulus (102 GPa by order of magnitude) of a stern bearing material is much larger than that (10-1 GPa by order of magnitude) of an inner lining material for stern bearing, it can be assumed that in the lubrication analysis, there is no elastic deformation on a surface of a shaft journal, and only the effect of elastic deformation of the bearing inner bore surface on a film thickness is taken into account. In this module, a flexibility matrix method is used to calculate the elastic deformation of the bearing inner bore surface.

A flexibility matrix $D_{\theta,z}^{\theta',z'}$ represents that: an elastic deformation displacement amount is generated at $(\theta,z)$ in a case that a unit pressure $p(\theta',z')$ acts on a bearing inner bore surface $(\theta',z')$. The flexibility matrix can be obtained by Ansys finite element software. An expression for calculating the elastic deformation by the flexibility matrix is:

$$\delta_E(\theta, z) = \int_{-B/2}^{+B/2}\int_{-\pi}^{+\pi} D_{\theta,z}^{\theta',z'} p(\theta', z')d\theta' dz'.$$

Alternatively, in a case that the water film pressure of the stern bearing is not converged, an updated water film thickness can be calculated on the basis of the geometric clearance, the inclination amount of the stern shaft and the structural deformation amount, the updated water film thickness is taken as the first water film thickness, and the step of calculating the water film pressure of the stern bearing on the basis of the first water film thickness is returned to and performed.

Alternatively, the inclination amount of the stern shaft can be adjusted by adjusting a first parameter in a case of imbalance between the load carrying capacity and the input load, and the step of calculating a first water film thickness of the stern bearing on the basis of a geometric clearance of the stern bearing and an inclination amount of a stern shaft is returned to and performed.

Specifically, if there is an imbalance between the load carrying capacity and the input load, the step of calculating the first water film thickness can be returned to and performed; and the first water film thickness is updated by adjusting the first parameter including an eccentricity ratio, angle of displacement, etc., ultimately allowing the balance between the load carrying capacity and the input load.

Alternatively, in a case that the timer does not reach the first time, the first water film thickness can be updated on the basis of the geometric clearance, the inclination amount of the stern shaft, the structural deformation amount, and the bearing wear depth.

Specifically, in a case that the timer does not reach the first time, the first water film thickness can be updated on the basis of the geometric clearance, the inclination amount of the stern shaft, the structural deformation amount, and the bearing wear depth calculated in the previous round, so as to perform the next round of lubrication analysis process.

Alternatively, the structural deformation amount includes a flexural deformation amount and an elastic deformation amount of the bearing shell, and an implementation manner of updating the first water film thickness on the basis of the geometric clearance, the inclination amount of the stern shaft, the structural deformation amount, and the bearing wear depth may include the following.

A first film thickness $h_1$ of the stern bearing is calculated taking an inclination of a shaft journal into account on the basis of the geometric clearance and the inclination amount of the stern shaft using Formula (1):

$$h_1 = c + (e_x^0 + z \cdot \tan \alpha_x) \sin \theta - (e_y^0 + z \cdot \tan \alpha_y) \cos \theta \quad (1)$$

where c characterizes a radius of a clearance, c=R−r, R characterizing a radius of a bearing, and r characterizing a radius of the shaft journal, $e_x^0$ characterizes an eccentric distance of a middle cross-section of the shaft journal in an x-direction, $e_y^0$ characterizes an eccentric distance of the middle cross-section of the shaft journal in a y-direction, z characterizes axial coordinates, $\alpha_x$ characterizes an inclination angle of the shaft journal in the x-direction, $\alpha_y$ characterizes an inclination angle of the shaft journal in the y-direction, and θ characterizes circumferential angle coordinates.

On the basis of the flexural deformation amount, a water film thickness change amount $h_{i\theta}$ corresponding to each cross-section of the stern bearing when deformed under load is calculated.

An updated first water film thickness is calculated on the basis of the first film thickness $h_1$, the water film thickness change amount $h_{i\theta}$, an elastic deformation amount $\delta_E$ of the bearing shell, and a bearing wear depth $h_w$.

Specifically, the bearing wear is analyzed as follows.

According to an Archard wear equation, a wear depth $h_w$ in a case that two surfaces are sliding against each other at a relative velocity v under an applied pressure $p_c$ is obtained by the following formula:

$$h_w = k \frac{p_c v t_1}{H_c}$$

where $p_c$ represents a contact pressure, $H_c$ represents a hardness of a softer material, k represents a constant, commonly referred to as a wear coefficient, and $t_1$ represents a wear time.

Alternatively, an implementation manner of calculating an updated first water film thickness on the basis of the first film thickness $h_1$, the water film thickness change amount $h_{i\theta}$, an elastic deformation amount $\delta_E$ of the bearing shell, and a bearing wear depth $h_w$ may include the following.

An updated first water film thickness h is calculated on the basis of the first film thickness $h_1$, the water film thickness change amount $h_{i\theta}$, the elastic deformation amount $\delta_E$ of the bearing shell, and the bearing wear depth $h_w$ using Formula (2):

$$h = h_1 + h_{i\theta} + h_w + \delta_E \quad (2).$$

Specifically, a final equation for a water film thickness is expressed as follows:

$$h = c + (e_x^0 + z \cdot \tan \alpha_x) \sin \theta - (e_y^0 + z \cdot \tan \alpha_y) \cos \theta + h_{i\theta} + h_w + \delta_E.$$

An example is given to describe the lubrication analysis method for a stern bearing based on magnetic-hydraulic composite support coupling provided in the embodiments of the present disclosure below.

The embodiments of the present disclosure provide a method that integrates four factors of fluid support, magnetic support, solid elastic deformation, and bearing wear, as well as the coupling effect between each of these factors and the lubrication analysis. The corresponding simulated analysis algorithm models of the present disclosure contain: a calculation module for hybrid elastohydrodynamic pressure lubrication of a water lubricated bearing, a calculation module for a water film thickness considering structural deformation and bearing wear, and a calculation module for simulation of a magnetic field of a Halbach permanent magnet array. On the basis of the above modules, an algorithmic model for analyzing the coupling of structural deformation (influenced by fluid pressure, contact pressure, and magnetic support force) and surface wear with hydrodynamic pressure lubrication is constructed, which can provide technical support for the simulation of water lubricated stern bearings with magnetic-hydraulic composite support.

I. Modules involved in the embodiments of the present disclosure are described as follows.

(1) The Calculation Module for Hybrid Elastohydrodynamic Pressure Lubrication of a Water Lubricated Bearing In this module, an average Reynolds equation is used as a governing equation for a water film region of a water lubricated stern bearing, with the following expression:

$$\frac{\partial}{\partial x}\left(\varphi_x \frac{\rho h^3}{\eta} \frac{\partial p}{\partial x}\right) + \frac{\partial}{\partial y}\left(\varphi_y \frac{\rho h^3}{\eta} \frac{\partial p}{\partial y}\right) = \varphi_c\left(6V_x \frac{\partial(\rho h)}{\partial x} + 6V_y \frac{\partial(\rho h)}{\partial y}\right) + 6V_x \sigma \frac{\partial(\rho \varphi s)}{\partial x}$$

where ∂ is a sign of a partial derivative, x and y represent coordinates, ρ represents a fluid (water) density, p represents a pressure, h represents a film thickness, $V_x$ and $V_y$ represent velocity components, and various flow factors (various q characterizing coefficients related to a water film thickness and parameters of surfaces of a bearing shaft and a shaft journal) are calculated by the following formulas:

$$\varphi_x = \begin{cases} 1 - ce^{-rH}, \gamma \le 1 \\ 1 + cH^{-r}, \gamma > 1 \end{cases},$$

$$\varphi_y = 1 + ce^{-rH},$$

$$\varphi_c = \begin{cases} e^{(-0.6912 + 0.782H - 0.304H^2 + 0.0401H^3)}, 0 \le H < 3 \\ 1 \text{ else} \end{cases}, \text{ and}$$

$$\varphi_s = \begin{cases} A_1 H^{\alpha_1} e^{-\alpha_2 \cdot H + \alpha_3 \cdot H^2}, H \le 5 \\ A_2 \cdot e^{-0.25H}, H > 5 \end{cases}$$

where H represents a film thickness ratio, $H = h/\sigma$, $\sigma$ representing an integrated surface roughness. The other coefficients involved are determined by a microscopic surface parameter $\gamma$ of a bearing, and the corresponding relationships are listed in the following table.

TABLE 1

Corresponding relationships between microscopic surface parameter $\gamma$ and other parameters

| $\gamma$ | c | r | $A_1$ | $A_2$ | $\alpha_1$ | $\alpha_2$ | $\alpha_3$ |
|---|---|---|---|---|---|---|---|
| 1/9 | 1.48 | 0.42 | 2.046 | 1.856 | 1.12 | 0.78 | 0.03 |
| 1/6 | 1.38 | 0.42 | 1.962 | 1.754 | 1.08 | 0.77 | 0.03 |
| 1/3 | 1.18 | 0.42 | 1.858 | 1.561 | 1.01 | 0.76 | 0.03 |
| 1 | 0.90 | 0.56 | 1.899 | 1.126 | 0.98 | 0.92 | 0.05 |
| 3 | 0.25 | 1.5 | 1.560 | 0.556 | 0.85 | 1.13 | 0.08 |
| 6 | 0.520 | 1.5 | 1.290 | 0.388 | 0.62 | 1.09 | 0.08 |
| 9 | 0.870 | 1.5 | 1.011 | 0.295 | 0.54 | 1.07 | 0.08 |

In this module, p represents a water film pressure (variable, water film pressure distribution; spatial distribution, two-dimensional) to be solved, and all other quantities are known: h (variable, water film thickness distribution; spatial distribution, two-dimensional) is obtained by a water film thickness calculation module, $V_x$ and $V_y$ are determined by operating conditions, various flow factors $\varphi$ are determined by the combination of h and the microscopic surface parameter $\gamma$, and a density $\rho$ and a kinetic viscosity $\eta$ are physical property parameters of the fluid (water), which can be understood as constants.

A numerical method (finite difference) is used to solve the equation corresponding to the governing equation for the water film region of the water lubricated stern bearing to obtain the water film pressure p. It is assumed that gridding the solved fluid region with a single-layer grid can satisfy the solution accuracy. An iterative expression for the water film pressure p is constructed as: $p^{(k_1+1)} = f(p^{(k_1)})$, where $k_1$ represents the number of steps in an iteration corresponding to a current step, and an over-relaxation iteration is used to accelerate the convergence process of the computation.

Pressure boundary conditions are required to set for solving a formula corresponding to the governing equation for the water film region of the water lubricated stern bearing. Reynolds boundary condition, which is closer to the actual situation and most widely used in research is taken as the pressure boundary condition. In the Reynolds boundary condition, it is assumed that the water film as a whole is not continuous all the time, and that the anomalous change in the water film pressure is a natural result from the rupture of the water film. If the rupture of the water film occurs somewhere after the minimum water film thickness $h_{min}$, the pressure of the water film after rupture is a cavitation pressure and the rate of pressure change is zero, that is:

$$\begin{cases} p|_{rupture} = p_a \\ \left.\dfrac{\partial p}{\partial \theta_{(x \text{ or } y)}}\right|_{rupture} = 0 \end{cases}.$$

The Reynolds boundary condition allows a lubricating medium between the beginning and the ending of the water film is continuous, and after the ending, the lubricating medium and air form a strip flow. The setting of the pressure boundary condition helps to perform lubrication and interface characteristics analysis on the stern bearings more accurately.

(2) The Calculation Module for a Water Film Thickness Considering Structural Deformation and Bearing Wear In this module, a water film thickness of a water lubricated stern bearing is determined by a geometric clearance, but is also affected by inclination and fluxture of a shaft journal, elastic deformation of an inner lining material for bearings and wear of a bearing inner bore surface.

1) Inclination of stern shaft; 2) flexure of stern shaft; 3) elastic deformation of bearing inner bore surface; 4) micro-convex body contact model; and 5) bearing wear.

According to 1) to 5), a final equation for the water film thickness can be obtained as:

$h = c + (e_x^0 + z \cdot \tan \alpha_x) \sin \theta - (e_y^0 + z \cdot \tan \alpha_y) \cos \theta + h_{i\theta} + h_w + \delta_E$.

(3) The Module for Simulation of a Magnetic Field of a Halbach Permanent Magnet Array According to the above description of the magnetic support characteristics analysis, the final output is:

$F_{MG} = \iint_{\Phi, Z} F_{mce} \cos \varphi d\varphi dz$.

Figure 9:
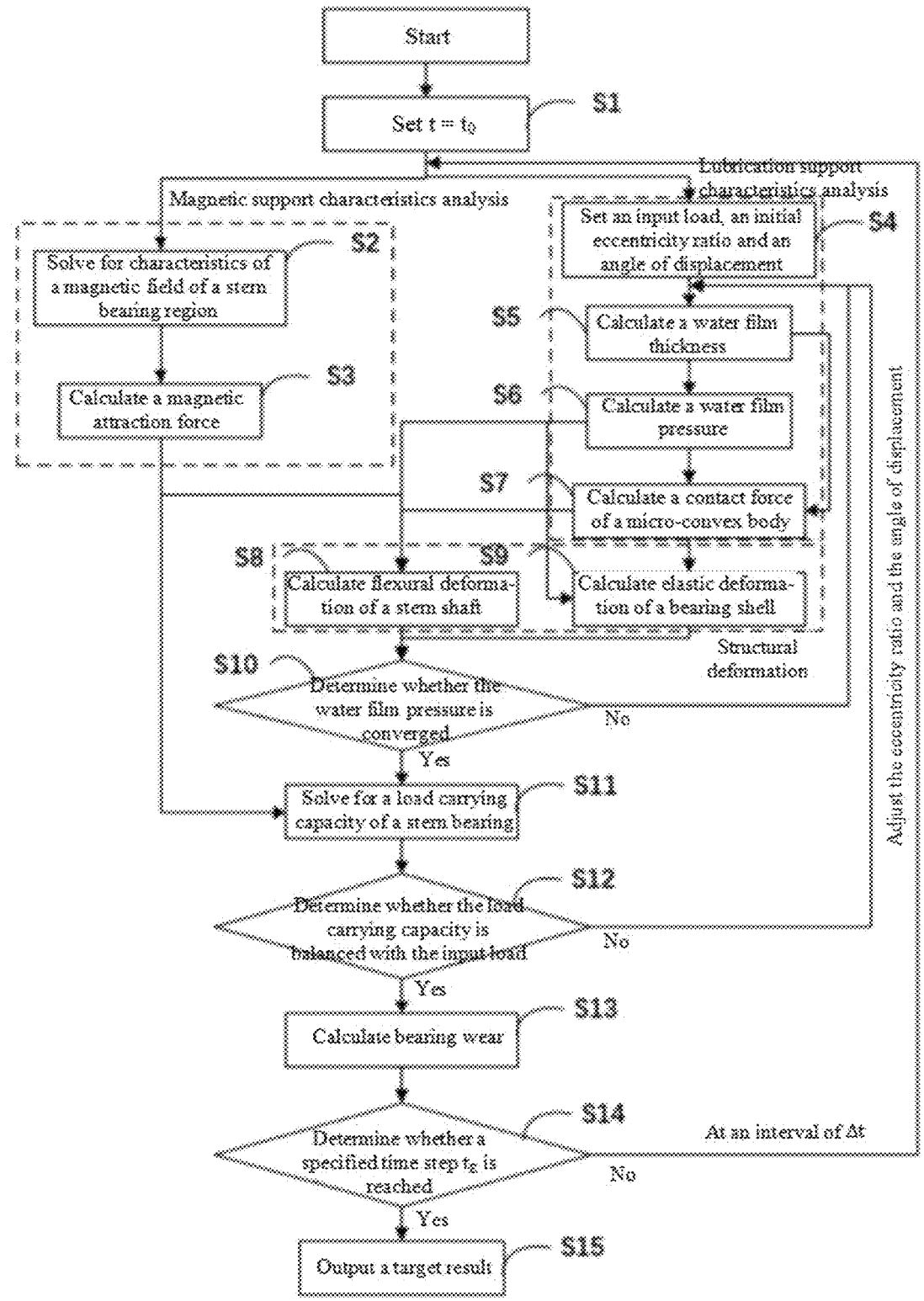
FIG. 9 is another flow chart of the lubrication analysis method for a stern bearing based on magnetic-hydraulic composite support coupling according to the present disclosure.

II. FIG. 9 is another flow chart of the lubrication analysis method for a stern bearing based on magnetic-hydraulic composite support coupling according to the present disclosure. As shown in FIG. 9, the following steps are included.

In S1, $t = t_0$ is set, where to represents an initial time.

In S2, magnetic field characteristics of a stern bearing region are solved for.

In S3, a magnetic attraction force is calculated.

In S4, an input load, an initial eccentricity ratio, and an angle of displacement are set.

In S5, a water film thickness is calculated.

In S6, a water film pressure is calculated.

In S7, a contact force of a micro-convex is calculated.

In S8, flexural deformation of the stern bearing is calculated.

In S9, elastic deformation of a bearing shell is calculated.

In S10, it is determined whether the water film pressure is converged, if so, S11 is entered, and if not, S5 is returned to.

Specifically, the convergence of the water film pressure is determined as follows.

A Reynolds equation is solved by a finite difference method (FDM). After discretizing a computational domain (water film region) with equally spaced grid nodes, shifting and change of variable are performed on the equation to facilitate the numerical solution, ultimately obtaining an iteratively solvable equation form:

$$p_{i,j}^{(k)} = f\left(p_{i,j}^{(k-1)}, p_{i-1,j}^{(k-1)}, p_{i+1,j}^{(k-1)}, p_{i,j-1}^{(k-1)}, p_{i,j+1}^{(k-1)}\right)$$

where k is a positive integer, representing the number of iteration steps, and i and j represent serial numbers of grid nodes in two directions.

A formula for determining the convergence of the water film pressure can be obtained as follows:

$$\frac{\sum_{i=1}^{m}\sum_{j=1}^{n}\left|p_{i,j}^{(k+1)} - p_{i,j}^{(k)}\right|}{\sum_{i=1}^{m}\sum_{j=1}^{n}p_{i,j}^{(k+1)}} \le 10^{-6}$$

where m and n represent the total number of grid nodes in both directions. If the above equation is workable, it means that the iterative computation of water film pressure reaches convergence, and otherwise, the iterative computation continues.

In S11, a load carrying capacity of the stern bearing is solved for.

In S12, it is determined whether the load carrying capacity is balanced with the input load, if so, S13 is entered; and if not, the eccentricity ratio and the angle of displacement are adjusted, and S5 is returned to.

Specifically, the balance between the load carrying capacity and the load is determined as follows.

A load carrying capacity $P_y$ of the stern bearing can be expressed in the following form: $P_y = P_y^L + P_y^c + F_{MG}$ where $P_y^L$ and $P_y^c$ represent a load carrying capacity of a water film and a load carrying capacity provided by the contact pressure of the micro-convex body, respectively, which are calculated as follows:

$$\begin{cases} P_y^L = \int_{-\frac{B}{2}}^{\frac{B}{2}} \int_0^{2\pi} pR\cos\theta d\theta dy \\ P_y^c = \int_{-\frac{B}{2}}^{\frac{B}{2}} \int_0^{2\pi} p_c R\cos\theta d\theta dy \end{cases}$$

The balance between the load carrying capacity $P_y$ and a load $W_y$ (given, vertical) is determined as follows:

$$\left|\frac{P_y - W_y}{W_y}\right| \le 10^{-3}.$$

If the above equation is workable, it means that the bearing capacity is balanced with the load.

In S13, bearing wear is calculated.

In S14, it is determined whether a specified time step t is reached, if so, S15 is entered; and if not, S2 and S4 are returned to and performed at an interval of Δt.

It is to be noted that in the embodiments of the present disclosure, the sequence of performing S2 and S4 is not limited.

In S15, a target result is outputted.

Specifically, the target result can include all intermediate quantities and final resulting quantities in the lubrication analysis process.

In the embodiments of the present disclosure, a lubrication analysis method for a stern bearing with a magnetic-hydraulic composite support structure is established on the basis of the theory of elastohydrodynamic pressure lubrication, the theory of micro-convex contact at the interface of the friction pair, the superposition algorithm of the flexure curve displacement of a cantilever beam, and the Archard wear theory.

A lubrication analysis device for a stern bearing based on magnetic-hydraulic composite support coupling provided by the present disclosure is described below, which can be cross-referenced with the lubrication analysis method for a stern bearing based on magnetic-hydraulic composite support coupling described above.

Figure 10:
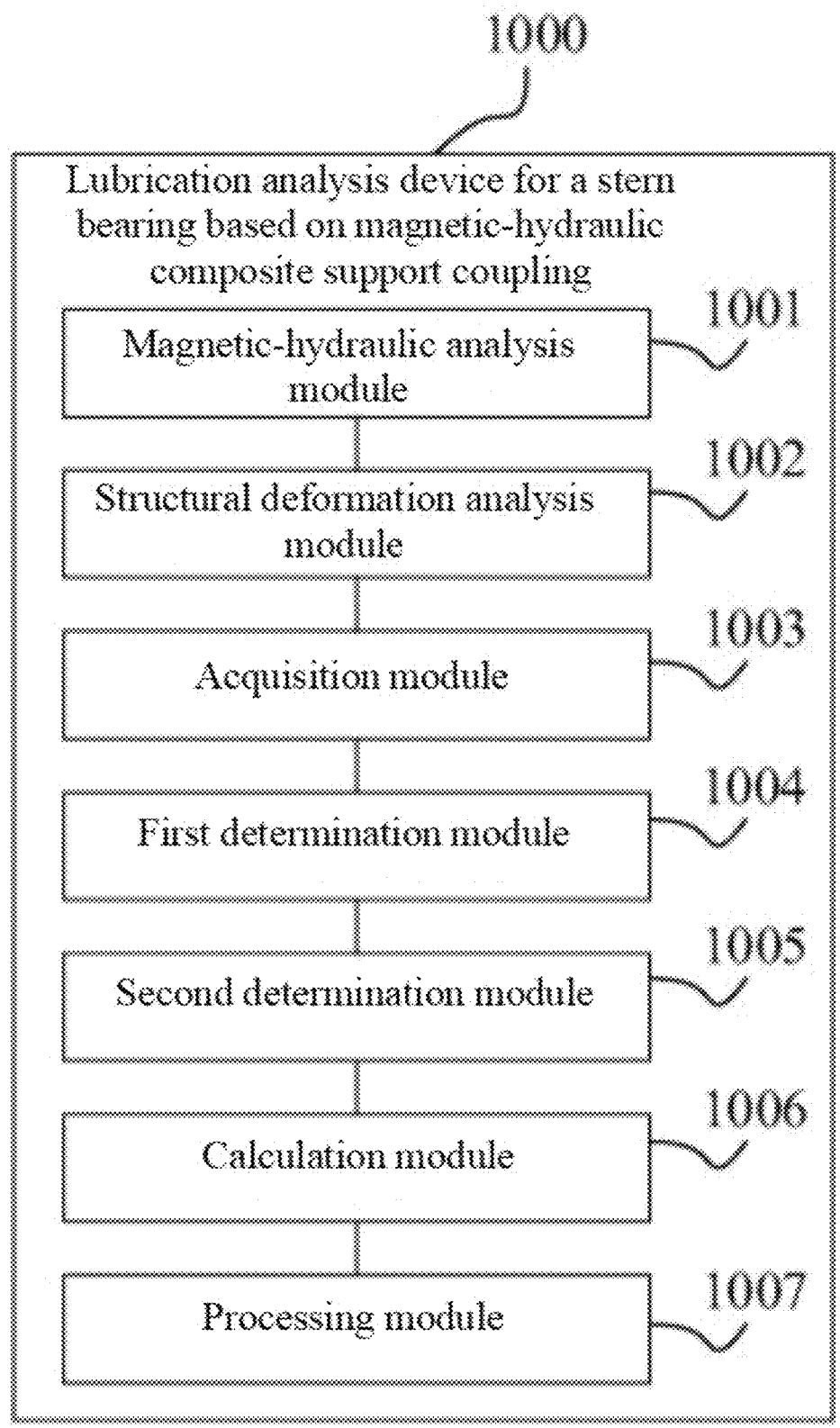
FIG. 10 is a schematic structural diagram of a lubrication analysis device for a stern bearing based on magnetic-hydraulic composite support coupling according to the present disclosure.

FIG. 10 is a schematic structural diagram of a lubrication analysis device for a stern bearing based on magnetic-hydraulic composite support coupling according to the present disclosure. As shown in FIG. 10, a lubrication analysis device 1000 for a stern bearing based on magnetic-hydraulic composite support coupling includes:

a magnetic-hydraulic analysis module 1001, configured to start a timer, perform magnetic support characteristics analysis on a stern bearing to be analyzed to obtain a magnetic support analysis result, and perform lubrication and interface characteristics analysis on the stern bearing to obtain a lubrication support analysis result;

a structural deformation analysis module 1002, configured to perform structural deformation analysis on the stern bearing on the basis of the magnetic support analysis result and the lubrication support analysis result, to obtain a structural deformation amount;

an acquisition module 1003, configured to correct a water film thickness in the lubrication support analysis result on the basis of the structural deformation amount, and return to and perform the step of performing lubrication and interface characteristics analysis on the stern bearing on the basis of the corrected water film thickness, to obtain a corresponding first water film pressure and second water film pressure before and after correcting the water film thickness;

a first determination module 1004, configured to determine whether a water film pressure of the stern bearing is converged on the basis of the first water film pressure and the second water film pressure;

a second determination module 1005, configured to solve for a load carrying capacity of the stern bearing on the basis of the magnetic support analysis result and the lubrication support analysis result in a case that the water film pressure of the stern bearing is converged;

a calculation module 1006, configured to calculate a bearing wear depth of the stern bearing on the basis of a contact force of a micro-convex body in the lubrication support analysis result in a case of balance between the load carrying capacity and an input load preset;

a processing module 1007, configured to return to and perform at an interval of a second time preset, if the timer does not reach a first time preset, the step of performing magnetic support characteristics analysis on a stern bearing to be analyzed to obtain a magnetic support analysis result and performing lubrication and interface characteristics analysis on the stern bearing to obtain a lubrication support analysis result; and output a target result if the timer reaches the first time, the target result including: at least one of the magnetic support analysis result, the lubrication support analysis result, the structural deformation amount, the load carrying capacity of the stern bearing, and the bearing wear depth.

In the lubrication analysis device for a stern bearing based on magnetic-hydraulic composite support coupling provided by the present disclosure, the timer can be started and lubrication analysis of the stern bearing is performed within the first time preset; wear-related parameters are updated in a case that the calculation of a current time step (the first time) is completed. In the specific process of the lubrication analysis, magnetic support characteristics analysis and lubrication and interface characteristics analysis are separately performed on the stern bearing to be analyzed to obtain the magnetic support analysis result and the lubrication support analysis result; structural deformation analysis is performed on the stern bearing on the basis of the magnetic support analysis result and the lubrication support analysis result to obtain the structural deformation amount; the water film thickness in the lubrication support analysis result is corrected on the basis of the structural deformation amount; the lubrication and interface characteristics analysis is repeated on the basis of the corrected water film thickness to obtain the corresponding first water film pressure and second water film pressure before and after the water film thickness is corrected, so that it can be determined whether the water film pressure of the stern bearing is converged by comparing the first water film pressure and the second water film pressure; in a case that the convergence occurs, the load carrying capacity of the stern bearing can be solved for on the basis of the magnetic support analysis result and the lubrication support analysis result, and it can be determined whether the load carrying capacity is balanced with the input load, and if so, the bearing wear depth of the stern bearing is calculated on the basis of the contact force (interface characteristic) of the micro-convex body in the lubrication support analysis result; and at this point, if the timer has not reached the first time, the step that magnetic support characteristics analysis and lubrication and interface characteristics analysis are performed on the stern bearing to be analyzed is returned to and performed until the timer reaches the first time, and the target result is outputted. The target result can be intermediate quantities and resulting quantities in the lubrication analysis process described above, and in the embodiments of the present disclosure, the target result can be utilized to effectively assess the lubrication degree of the stern bearing based on the magnetic-hydraulic composite support.

Alternatively, the magnetic-hydraulic analysis module 1001 is specifically configured to:
calculate a first water film thickness of a stern bearing on the basis of a geometric clearance of the stern bearing and an inclination amount of a stern shaft;
calculate a water film pressure of the stern bearing on the basis of the first water film thickness;
calculate a contact force of a micro-convex body in the stern bearing on the basis of the first water film thickness and the water film pressure; and
take at least one of the first water film thickness, the water film pressure and the contact force of the micro-convex body as the lubrication support analysis result.

Alternatively, the magnetic support analysis result includes a magnetic attraction force of the stern bearing; and
the structural deformation analysis module 1002 is specifically configured to:
calculate a flexural deformation amount of the stern bearing on the basis of the water film pressure, the contact force of the micro-convex body and the magnetic attraction force;
calculate an elastic deformation amount of a bearing shell of the stern bearing on the basis of the water film pressure and the contact force of the micro-convex body; and take at least one of the flexural deformation amount and the elastic deformation amount of the bearing shell as the structural deformation amount.

Alternatively, the processing module 1007 is further configured to:
calculate, in a case that the water film pressure of the stern bearing is not converged, an updated water film thickness on the basis of the geometric clearance, the inclination amount of the stern shaft and the structural deformation amount, take the updated water film thickness as the first water film thickness, and return to and perform the step of calculating the water film pressure of the stern bearing on the basis of the first water film thickness Alternatively, the processing module 1007 is further configured to:
adjust the inclination amount of the stern shaft by adjusting a first parameter in a case of imbalance between the load carrying capacity and the input load, and return to and perform the step of calculating a first water film thickness of the stern bearing on the basis of a geometric clearance of the stern bearing and an inclination amount of a stern shaft.

Alternatively, the processing module 1007 is further configured to:
update, in a case that the timer does not reach the first time, the first water film thickness on the basis of the geometric clearance, the inclination amount of the stern shaft, the structural deformation amount, and the bearing wear depth.

Alternatively, the structural deformation amount includes a flexural deformation amount and an elastic deformation amount of the bearing shell.

The processing module 1007 is further specifically configured to:
calculate a first film thickness $h_1$ of the stern bearing taking an inclination of a shaft journal into account on the basis of the geometric clearance and the inclination amount of the stern shaft using Formula (1):

$$h_1 = c + (e_x^0 + z \cdot \tan \alpha_x) \sin \theta - (e_y^0 + z \cdot \tan \alpha_y) \cos \theta$$

where c characterizes a radius of a clearance, c=R−r, R characterizing a radius of a bearing, and r characterizing a radius of the shaft journal, $e_x^0$ characterizes an eccentric distance of a middle cross-section of the shaft journal in an x-direction, $e_y^0$ characterizes an eccentric distance of the middle cross-section of the shaft journal in a y-direction, z characterizes axial coordinates, $\alpha_x$ characterizes an inclination angle of the shaft journal in the x-direction, $\alpha_y$ characterizes an inclination angle of the shaft journal in the y-direction, and θ characterizes circumferential angle coordinates;
calculate, on the basis of the flexural deformation amount, a water film thickness change amount $h_{i\theta}$ corresponding to each cross-section of the stern bearing when deformed under load; and
calculate an updated first water film thickness on the basis of the first film thickness $h_1$, the water film thickness change amount $h_{i\theta}$, an elastic deformation amount $\delta_E$ of the bearing shell, and a bearing wear depth $h_w$.

Alternatively, the processing module 1007 is further specifically configured to:
calculate an updated first water film thickness h on the basis of the first film thickness $h_1$, the water film thickness change amount $h_{i\theta}$, the elastic deformation amount $\delta_E$ of the bearing shell, and the bearing wear depth $h_w$ using Formula (2):

$$h = h_1 + h_{i\theta} + h_w + \delta_E \qquad (2).$$

Figure 11:
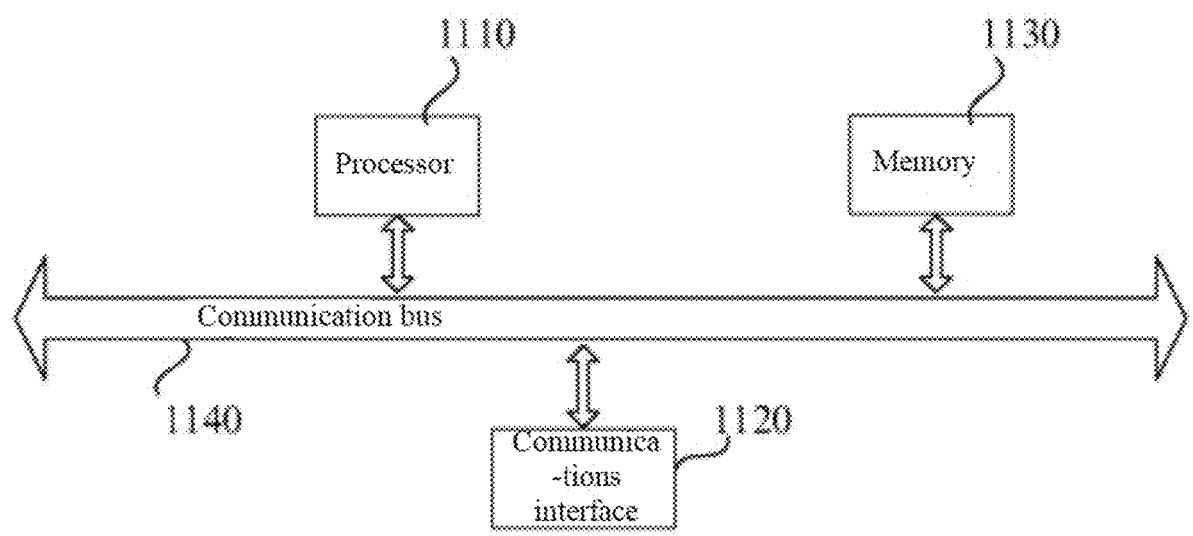
FIG. 11 is a schematic structural diagram of an electronic apparatus according to the present disclosure.

FIG. 11 is a schematic structural diagram of an electronic apparatus according to the present disclosure. As shown in FIG. 11, the electronic apparatus may include: a processor 1110, a communications interface 1120, a memory 1130 and a communication bus 1140, in which, the processor 1110, the communications interface 1120 and the memory 1130 are mutually communicated via the communication bus 1140. The processor 1110 may employ logic instructions in the memory 1130 to implement a lubrication analysis method for a stern bearing based on magnetic-hydraulic composite support coupling, the method including the following.

A timer is started, magnetic support characteristics analysis is performed on a stern bearing to be analyzed to obtain a magnetic support analysis result, and lubrication and interface characteristics analysis is performed on the stern bearing to obtain a lubrication support analysis result.

Structural deformation analysis is performed on the stern bearing on the basis of the magnetic support analysis result and the lubrication support analysis result, to obtain a structural deformation amount.

A water film thickness in the lubrication support analysis result is corrected on the basis of the structural deformation amount, and the step of performing lubrication and interface characteristics analysis on the stern bearing on the basis of a corrected water film thickens is returned to and performed, to obtain a corresponding first water film pressure and second water film pressure before and after the water film thickness is corrected.

It is determined whether a water film pressure of the stern bearing is converged on the basis of the first water film pressure and the second water film pressure.

A load carrying capacity of the stern bearing is solved for on the basis of the magnetic support analysis result and the lubrication support analysis result in a case that the water film pressure of the stern bearing is converged.

A bearing wear depth of the stern bearing is calculated on the basis of a contact force of a micro-convex body in the lubrication support analysis result in a case of balance between the load carrying capacity and an input load preset.

If the timer does not reach a first time preset, the step of performing magnetic support characteristics analysis on a stern bearing to be analyzed to obtain a magnetic support analysis result and performing lubrication and interface characteristics analysis on the stern bearing to obtain a lubrication support analysis result is returned to and performed at an interval of a second time preset; and a target result is outputted if the timer reaches the first time, the target result including: at least one of the magnetic support analysis result, the lubrication support analysis result, the structural deformation amount, the load carrying capacity of the stern bearing, and the bearing wear depth.

Moreover, the logic instructions in the memory 1130 described above may be stored in a computer-readable storage medium when implemented in the form of a software function unit and sold or used as a separate product. On the basis of this understanding, the technical solution of the present disclosure may be embodied essentially or in part as a contribution to the prior art, or part of the technical solution may be embodied in the form of a software product, which is a computer software product stored in a storage medium including a number of instructions for causing a computer apparatus (which may be a personal computer, a server, or a network device, etc.) to carry out all or part of the steps of the method described in the various embodiments of the present disclosure. The aforementioned storage medium includes: a U flash disc, a mobile hard disk, a read-only memory (ROM), a random access memory (RAM), a magnetic disk or a compact disc (CD), and other media that can store program code.

In another aspect, the present disclosure further provides a computer program product including a computer program. The computer program may be stored on a non-transitory computer-readable storage medium. When the computer program is executed by a processor, the computer may implement a lubrication analysis method for a stern bearing based on magnetic-hydraulic composite support coupling described above, the method including the following.

A timer is started, magnetic support characteristics analysis is performed on a stern bearing to be analyzed to obtain a magnetic support analysis result, and lubrication and interface characteristics analysis is performed on the stern bearing to obtain a lubrication support analysis result.

Structural deformation analysis is performed on the stern bearing on the basis of the magnetic support analysis result and the lubrication support analysis result, to obtain a structural deformation amount.

A water film thickness in the lubrication support analysis result is corrected on the basis of the structural deformation amount, and the step of performing lubrication and interface characteristics analysis on the stern bearing on the basis of a corrected water film thickens is returned to and performed, to obtain a corresponding first water film pressure and second water film pressure before and after the water film thickness is corrected.

It is determined whether a water film pressure of the stern bearing is converged on the basis of the first water film pressure and the second water film pressure.

A load carrying capacity of the stern bearing is solved for on the basis of the magnetic support analysis result and the lubrication support analysis result in a case that the water film pressure of the stern bearing is converged.

A bearing wear depth of the stern bearing is calculated on the basis of a contact force of a micro-convex body in the lubrication support analysis result in a case of balance between the load carrying capacity and an input load preset.

If the timer does not reach a first time preset, the step of performing magnetic support characteristics analysis on a stern bearing to be analyzed to obtain a magnetic support analysis result and performing lubrication and interface characteristics analysis on the stern bearing to obtain a lubrication support analysis result is returned to and performed at an interval of a second time preset; and a target result is outputted if the timer reaches the first time, the target result including: at least one of the magnetic support analysis result, the lubrication support analysis result, the structural deformation amount, the load carrying capacity of the stern bearing, and the bearing wear depth.

In yet another aspect, the present disclosure further provides a non-transitory computer-readable storage medium having a computer program stored thereon. When the computer program is executed by a processor, a lubrication analysis method for a stern bearing based on magnetic-hydraulic composite support coupling described above is implemented, the method including the following.

A timer is started, magnetic support characteristics analysis is performed on a stern bearing to be analyzed to obtain a magnetic support analysis result, and lubrication and interface characteristics analysis is performed on the stern bearing to obtain a lubrication support analysis result.

Structural deformation analysis is performed on the stern bearing on the basis of the magnetic support analysis result and the lubrication support analysis result, to obtain a structural deformation amount.

A water film thickness in the lubrication support analysis result is corrected on the basis of the structural deformation amount, and the step of performing lubrication and interface characteristics analysis on the stern bearing on the basis of a corrected water film thickens is returned to and performed, to obtain a corresponding first water film pressure and second water film pressure before and after correcting the water film thickness.

It is determined whether a water film pressure of the stern bearing is converged on the basis of the first water film pressure and the second water film pressure.

A load carrying capacity of the stern bearing is solved for on the basis of the magnetic support analysis result and the lubrication support analysis result in a case that the water film pressure of the stern bearing is converged.

A bearing wear depth of the stern bearing is calculated on the basis of a contact force of a micro-convex body in the lubrication support analysis result in a case of balance between the load carrying capacity and an input load preset.

If the timer does not reach a first time preset, the step of performing magnetic support characteristics analysis on a stern bearing to be analyzed to obtain a magnetic support analysis result and performing lubrication and interface characteristics analysis on the stern bearing to obtain a lubrication support analysis result is returned to and performed at an interval of a second time preset; and a target result is outputted if the timer reaches the first time, the target result including: at least one of the magnetic support analysis result, the lubrication support analysis result, the structural deformation amount, the load carrying capacity of the stern bearing, and the bearing wear depth.

The embodiments for the device described above are merely schematic, the units described as illustrated as separated components may or may not be physically separated, and the components shown as units may or may not be physical units, i.e., they may be located in a single place or may also be distributed to a plurality of network units. Some or all of modules may be selected to realize the objective of the solution of the embodiments according to actual needs. It can be understood and implemented by a person of ordinary skill in the art without creative efforts.

Through the above description of the embodiments, the person of ordinary skill in the art can clearly understand that the embodiments can be realized by means of software and the necessary general hardware platform, and of course, by means of hardware. On the basis of the above understanding, the above technical solutions which essentially or rather contribute to the prior art may be embodied in the form of a software product which is a computer software product and may be stored in a computer-readable storage medium, such as an ROM/RAM, a disk, a CD, etc., and which includes a number of instructions to cause a computer apparatus (which may be a personal computer, a server, or a network device, etc.) to execute the method in various embodiments or in certain portions of the embodiments.

It is finally to be noted that: the embodiments described above are merely used for illustrating the technical solutions of the present disclosure, rather than limiting the present disclosure. Although the present disclosure is described in detail by reference to the foregoing embodiments, it is to be understood by those ordinary skilled in the art that the technical solutions set forth in each embodiment can still be modified or some technical features thereof can be replaced equivalently, and those modifications or equivalent replacements cannot make the modified technical solution out of the spirit and scope of the technical solution of the present disclosure.

The invention claimed is:

1. A lubrication analysis method for a stern bearing based on magnetic-hydraulic composite support coupling, comprising:
   starting a timer, performing magnetic support characteristics analysis on a stern bearing to be analyzed to obtain a magnetic support analysis result, and performing lubrication and interface characteristics analysis on the stern bearing to obtain a lubrication support analysis result,
   performing structural deformation analysis on the stern bearing on the basis of the magnetic support analysis result and the lubrication support analysis result, to obtain a structural deformation amount,
   correcting a water film thickness in the lubrication support analysis result on the basis of the structural deformation amount, and returning to and performing the step of performing lubrication and interface characteristics analysis on the stern bearing on the basis of a corrected water film thickness, to obtain a corresponding first water film pressure and second water film pressure before and after correcting the water film thickness,
   determining whether a water film pressure of the stern bearing is converged on the basis of the first water film pressure and the second water film pressure,
   solving for a load carrying capacity of the stern bearing on the basis of the magnetic support analysis result and the lubrication support analysis result in a case that the water film pressure of the stern bearing is converged,
   calculating a bearing wear depth of the stern bearing on the basis of a contact force of a micro-convex body in the lubrication support analysis result in a case of balance between the load carrying capacity and an input load preset,
   returning to and performing at an interval of a second time preset, if the timer does not reach a first time preset, the step of performing magnetic support characteristics analysis on a stern bearing to be analyzed to obtain a magnetic support analysis result and performing lubrication and interface characteristics analysis on the stern bearing to obtain a lubrication support analysis result, and
   output a target result if the timer reaches the first time, the target result comprising: at least one of the magnetic support analysis result, the lubrication support analysis result, the structural deformation amount, the load carrying capacity of the stern bearing, and the bearing wear depth, wherein
   the performing lubrication and interface characteristics analysis on the stern bearing to obtain a lubrication support analysis result comprises:
   calculating a first water film thickness of the stern bearing on the basis of a geometric clearance of the stern bearing and an inclination amount of a stern shaft,
   calculating the water film pressure of the stern bearing on the basis of the first water film thickness,
   calculating a contact force of a micro-convex body in the stern bearing on the basis of the first water film thickness and the water film pressure, and
   taking at least one of the first water film thickness, the water film pressure and the contact force of the micro-convex body as the lubrication support analysis result; and the magnetic support analysis result comprises a magnetic attraction force of the stern bearing; and the performing structural deformation analysis on the stern bearing on the basis of the magnetic support analysis result and the lubrication support analysis result, to obtain a structural deformation amount comprises:

calculating a flexural deformation amount of the stern bearing on the basis of the water film pressure, the contact force of the micro-convex body and the magnetic attraction force, calculating an elastic deformation amount of a bearing shell of the stern bearing on the basis of the water film pressure and the contact force of the micro-convex body, and taking at least one of the flexural deformation amount and the elastic deformation amount of the bearing shell as the structural deformation amount.

2. The lubrication analysis method for a stern bearing based on magnetic-hydraulic composite support coupling according to claim 1, further comprising:

calculating, in a case that the water film pressure of the stern bearing is not converged, an updated water film thickness on the basis of the geometric clearance, the inclination amount of the stern shaft and the structural deformation amount, taking the updated water film thickness as the first water film thickness, and returning to and performing the step of calculating the water film pressure of the stern bearing on the basis of the first water film thickness.

3. The lubrication analysis method for a stern bearing based on magnetic-hydraulic composite support coupling according to claim 1, further comprising:

adjusting the inclination amount of the stern shaft by adjusting a first parameter in a case of imbalance between the load carrying capacity and the input load, and returning to and performing the step of calculating a first water film thickness of the stern bearing on the basis of a geometric clearance of the stern bearing and an inclination amount of a stern shaft.

4. The lubrication analysis method for a stern bearing based on magnetic-hydraulic composite support coupling according to claim 1, further comprising:

updating, in a case that the timer does not reach the first time, the first water film thickness on the basis of the geometric clearance, the inclination amount of the stern shaft, the structural deformation amount, and the bearing wear depth.

5. The lubrication analysis method for a stern bearing based on magnetic-hydraulic composite support coupling according to claim 4, wherein the structural deformation amount comprises a flexural deformation amount and an elastic deformation amount of the bearing shell, and the updating the first water film thickness on the basis of the geometric clearance, the inclination amount of the stern shaft, the structural deformation amount, and the bearing wear depth comprises:

calculating, using Formula (1), a first film thickness $h_1$ of the stern bearing taking an inclination of a shaft journal into account on the basis of the geometric clearance and the inclination amount of the stern shaft:

$$h_1 = c + (e_x^0 + z \cdot \tan \alpha_x) \sin \theta - (e_y^0 + z \cdot \tan \alpha_y) \cos \theta \quad (1)$$

where c characterizes a radius of a clearance, $c = R - r$, R characterizing a radius of a bearing, and r characterizing a radius of the shaft journal, $e_x^0$ characterizes an eccentric distance of a middle cross-section of the shaft journal in an x-direction, $e_y^0$ characterizes an eccentric distance of the middle cross-section of the shaft journal in a y-direction, z characterizes axial coordinates, $\alpha_x$ characterizes an inclination angle of the shaft journal in the x-direction, $\alpha_y$ characterizes an inclination angle of the shaft journal in the y-direction, and $\theta$ characterizes circumferential angle coordinates;

calculating, on the basis of the flexural deformation amount, a water film thickness change amount $h_{i\theta}$ corresponding to each cross-section of the stern bearing when deformed under load; and calculating an updated first water film thickness on the basis of the first film thickness $h_1$, the water film thickness change amount $h_{i\theta}$, an elastic deformation amount $\delta_E$ of the bearing shell, and a bearing wear depth $h_w$.

6. The lubrication analysis method for a stern bearing based on magnetic-hydraulic composite support coupling according to claim 5, wherein the calculating an updated first water film thickness on the basis of the first film thickness $h_1$, the water film thickness change amount $h_{i\theta}$, an elastic deformation amount $\delta_E$ of the bearing shell, and a bearing wear depth $h_w$ comprises:

calculating, using Formula (2), an updated first water film thickness h on the basis of the first film thickness $h_1$, the water film thickness change amount $h_{i\theta}$, the elastic deformation amount $\delta_E$ of the bearing shell, and the bearing wear depth $h_w$:

$$h = h_1 + h_{i\theta} + h_w + \delta_E \quad (2).$$

7. A lubrication analysis device for a stern bearing based on magnetic-hydraulic composite support coupling, comprising:

a magnetic-hydraulic analysis module, configured to start a timer, perform magnetic support characteristics analysis on a stern bearing to be analyzed to obtain a magnetic support analysis result, and perform lubrication and interface characteristics analysis on the stern bearing to obtain a lubrication support analysis result, a structural deformation analysis module, configured to perform structural deformation analysis on the stern bearing on the basis of the magnetic support analysis result and the lubrication support analysis result, to obtain a structural deformation amount, an acquisition module, configured to correct a water film thickness in the lubrication support analysis result on the basis of the structural deformation amount, and return to and perform the step of performing lubrication and interface characteristics analysis on the stern bearing on the basis of a corrected water film thickness, to obtain a corresponding first water film pressure and second water film pressure before and after correcting the water film thickness, a first determination module, configured to determine, on the basis of the first water film pressure and the second water film pressure, whether a water film pressure of the stern bearing is converged, a second determination module, configured to solve for a load carrying capacity of the stern bearing on the basis of the magnetic support analysis result and the lubrication support analysis result in a case that the water film pressure of the stern bearing is converged, a calculation module, configured to calculate a bearing wear depth of the stern bearing on the basis of a contact force of a micro-convex body in the lubrication support analysis result in a case of balance between the load carrying capacity and an input load preset, and a processing module, configured to return to and perform at an interval of a second time preset, if the timer does not reach a first time preset, the step of performing magnetic support characteristics analysis on a stern bearing to be analyzed to obtain a magnetic support analysis result and performing lubrication and interface characteristics analysis on the stern bearing to obtain a lubrication support analysis result, and output a target result if the timer reaches the first time, the target result comprising: at least one of the magnetic support analysis result, the lubrication support analysis result, the structural deformation amount, the load carrying capacity of the stern bearing, and the bearing wear depth, wherein the magnetic-hydraulic analysis module is specifically configured to:

calculate a first water film thickness of the stern bearing on the basis of a geometric clearance of the stern bearing and an inclination amount of a stern shaft, calculate the water film pressure of the stern bearing on the basis of the first water film thickness, calculate a contact force of a micro-convex body in the stern bearing on the basis of the first water film thickness and the water film pressure, and take at least one of the first water film thickness, the water film pressure and the contact force of the micro-convex body as the lubrication support analysis result; and the magnetic support analysis result comprises a magnetic attraction force of the stern bearing; and the structural deformation analysis module is specifically configured to:

calculate a flexural deformation amount of the stern bearing on the basis of the water film pressure, the contact force of the micro-convex body and the magnetic attraction force, calculate an elastic deformation amount of a bearing shell of the stern bearing on the basis of the water film pressure and the contact force of the micro-convex body, and take at least one of the flexural deformation amount and the elastic deformation amount of the bearing shell as the structural deformation amount.

8. An electronic apparatus, comprising a memory, a processor, and a computer program stored in the memory and runnable in the processor, wherein a lubrication analysis method for a stern bearing based on magnetic-hydraulic composite support coupling according to claim 1 is implemented when the processor executes the program.

9. An electronic apparatus, comprising a memory, a processor, and a computer program stored in the memory and runnable in the processor, wherein a lubrication analysis method for a stern bearing based on magnetic-hydraulic composite support coupling according to claim 2 is implemented when the processor executes the program.

10. An electronic apparatus, comprising a memory, a processor, and a computer program stored in the memory and runnable in the processor, wherein a lubrication analysis method for a stern bearing based on magnetic-hydraulic composite support coupling according to claim 3 is implemented when the processor executes the program.

11. An electronic apparatus, comprising a memory, a processor, and a computer program stored in the memory and runnable in the processor, wherein a lubrication analysis method for a stern bearing based on magnetic-hydraulic composite support coupling according to claim 4 is implemented when the processor executes the program.

12. An electronic apparatus, comprising a memory, a processor, and a computer program stored in the memory and runnable in the processor, wherein a lubrication analysis method for a stern bearing based on magnetic-hydraulic composite support coupling according to claim 5 is implemented when the processor executes the program.

13. An electronic apparatus, comprising a memory, a processor, and a computer program stored in the memory and runnable in the processor, wherein a lubrication analysis method for a stern bearing based on magnetic-hydraulic composite support coupling according to claim 6 is implemented when the processor executes the program.

* * * * *